(12) United States Patent
Conger et al.

(10) Patent No.: US 9,155,283 B2
(45) Date of Patent: *Oct. 13, 2015

(54) ANIMAL HUSBANDRY DRAWER CAGING

(75) Inventors: Dee L. Conger, La Jolla, CA (US); Francesca McGuffie, San Diego, CA (US); Thomas M. Perazzo, San Diego, CA (US); Matthew D. D'Artenay, San Diego, CA (US)

(73) Assignee: INNOVIVE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/101,046

(22) Filed: Apr. 10, 2008

(65) Prior Publication Data

US 2008/0282990 A1    Nov. 20, 2008

Related U.S. Application Data

(60) Provisional application No. 60/911,271, filed on Apr. 11, 2007, provisional application No. 60/979,721, filed on Oct. 12, 2007.

(51) Int. Cl.
*A01K 1/02* (2006.01)
*A01K 1/03* (2006.01)

(52) U.S. Cl.
CPC ...................... *A01K 1/031* (2013.01)

(58) Field of Classification Search
CPC ......... A01K 1/03; A01K 1/031; A01K 63/00; A01K 63/02; A01K 63/04
USPC ......... 119/455, 456, 457, 458, 453, 417–421, 119/478
See application file for complete search history.

(56) References Cited

U.S. PATENT DOCUMENTS

| | | | |
|---|---|---|---|
| 513,557 A | 1/1894 | Cobb | |
| 1,909,611 A | 5/1933 | Charavay | |
| 2,554,086 A | 5/1951 | Block | |
| 2,988,044 A * | 6/1961 | Adelberg et al. | 119/417 |
| 3,002,492 A | 10/1961 | Naturale | |
| 3,084,850 A | 4/1963 | Engalitcheff, Jr. | |
| 3,087,458 A | 4/1963 | Bennett | |
| 3,096,933 A | 7/1963 | Bora | |
| 3,122,127 A * | 2/1964 | Shechmeister et al. | 119/417 |
| 3,127,872 A | 4/1964 | Finkel | |
| 3,163,149 A | 12/1964 | Ivey | |
| 3,212,474 A | 10/1965 | Higgins et al. | |
| 3,225,738 A | 12/1965 | Palencia | |
| 3,302,615 A | 2/1967 | Tietje | |

(Continued)

FOREIGN PATENT DOCUMENTS

| | | |
|---|---|---|
| EP | 0160336 | 11/1985 |
| EP | 0233134 | 8/1987 |

(Continued)

OTHER PUBLICATIONS

U.S. Appl. No. 11/695,084, filed Apr. 2, 2007, Conger et al.

(Continued)

*Primary Examiner* — Joshua Huson
(74) *Attorney, Agent, or Firm* — Grant IP, Inc.

(57) ABSTRACT

Provided herein are slidable "drawer" animal containment systems that allow for ready access to contained animals. In certain embodiments, the animal containment systems include disposable cages, and the systems are ventilated in some embodiments.

11 Claims, 21 Drawing Sheets

(56) References Cited

U.S. PATENT DOCUMENTS

| | | |
|---|---|---|
| 3,334,614 A | 8/1967 | Gass et al. |
| 3,397,676 A * | 8/1968 | Barney .......................... 119/417 |
| 3,465,722 A | 9/1969 | Duff |
| 3,500,831 A | 3/1970 | Schaar |
| 3,518,971 A | 7/1970 | Gass et al. |
| 3,524,431 A | 8/1970 | Graham et al. |
| 3,537,428 A | 11/1970 | Montgomery |
| 3,547,309 A | 12/1970 | Pusey et al. |
| 3,649,464 A | 3/1972 | Feeman |
| 3,662,713 A | 5/1972 | Sachs |
| 3,698,360 A | 10/1972 | Rubricius |
| 3,718,120 A | 2/1973 | Schwarz |
| 3,731,657 A | 5/1973 | Alessio |
| 3,765,374 A | 10/1973 | Kolste |
| 3,768,546 A | 10/1973 | Shipes |
| 3,771,686 A * | 11/1973 | Brison .......................... 220/4.21 |
| 3,776,195 A | 12/1973 | Willinger |
| 3,791,346 A | 2/1974 | Willinger et al. |
| 3,924,571 A | 12/1975 | Holman |
| 3,958,534 A | 5/1976 | Perkins |
| 3,965,865 A | 6/1976 | Kundikoff |
| 4,022,159 A | 5/1977 | Salvia |
| 4,023,529 A | 5/1977 | Landy |
| 4,043,256 A | 8/1977 | VanHuis |
| 4,075,618 A | 2/1978 | Montean |
| 4,161,159 A | 7/1979 | Leong |
| 4,177,761 A * | 12/1979 | Bellocchi, Jr. ................ 119/482 |
| 4,252,080 A | 2/1981 | Gioia et al. |
| 4,343,261 A | 8/1982 | Thomas |
| 4,365,590 A | 12/1982 | Ruggieri et al. |
| 4,367,728 A | 1/1983 | Mutke |
| 4,402,280 A * | 9/1983 | Thomas .......................... 119/418 |
| 4,448,150 A | 5/1984 | Catsimpoolas |
| 4,480,587 A | 11/1984 | Sedlacek |
| 4,528,941 A | 7/1985 | Spengler |
| 4,551,311 A | 11/1985 | Lorenz |
| 4,593,650 A | 6/1986 | Lattuada |
| 4,640,228 A | 2/1987 | Sedlacek et al. |
| 4,690,100 A | 9/1987 | Thomas |
| 4,699,088 A | 10/1987 | Murray et al. |
| 4,699,188 A | 10/1987 | Baker et al. |
| 4,728,006 A | 3/1988 | Drobish et al. |
| 4,774,631 A | 9/1988 | Okuyama et al. |
| 4,779,566 A | 10/1988 | Morris et al. |
| 4,798,171 A | 1/1989 | Peters et al. |
| 4,844,018 A | 7/1989 | Niki |
| 4,892,209 A | 1/1990 | Dorfman et al. |
| 4,907,536 A | 3/1990 | Chrisler |
| 4,940,017 A | 7/1990 | Niki et al. |
| 4,941,431 A | 7/1990 | Anderson et al. |
| 4,976,219 A | 12/1990 | Goguen et al. |
| 4,991,635 A | 2/1991 | Ulm |
| 5,000,120 A | 3/1991 | Coiro, Sr. et al. |
| 5,003,922 A | 4/1991 | Niki et al. |
| 5,031,515 A | 7/1991 | Niemela et al. |
| 5,044,316 A | 9/1991 | Thomas |
| 5,048,459 A | 9/1991 | Niki et al. |
| 5,081,955 A | 1/1992 | Yoneda et al. |
| 5,148,766 A | 9/1992 | Coiro, Sr. et al. |
| 5,163,380 A | 11/1992 | Duffy |
| 5,165,362 A | 11/1992 | Sheaffer et al. |
| 5,213,059 A | 5/1993 | Krantz |
| 5,307,757 A | 5/1994 | Coiro, Sr. et al. |
| 5,316,172 A | 5/1994 | Apps et al. |
| 5,328,049 A * | 7/1994 | Ritzow .......................... 220/315 |
| 5,331,920 A | 7/1994 | Coiro, Sr. et al. |
| 5,349,923 A | 9/1994 | Sheaffer et al. |
| 5,385,118 A | 1/1995 | Coiro, Sr. et al. |
| 5,400,744 A | 3/1995 | Coiro, Sr. et al. |
| 5,407,129 A | 4/1995 | Carey et al. |
| 5,407,648 A | 4/1995 | Allen et al. |
| 5,429,800 A | 7/1995 | Miraldi et al. |
| 5,471,950 A | 12/1995 | White |
| 5,474,024 A | 12/1995 | Hallock |
| 5,513,596 A | 5/1996 | Coiro, Sr. et al. |
| 5,567,364 A | 10/1996 | Phillipps |
| 5,572,403 A | 11/1996 | Mills |
| 5,572,953 A | 11/1996 | Phelan et al. |
| 5,605,240 A | 2/1997 | Guglielmini |
| 5,608,209 A | 3/1997 | Matsuda |
| 5,624,037 A | 4/1997 | Kozo |
| 5,635,403 A | 6/1997 | Bailey |
| 5,655,478 A | 8/1997 | Kiera |
| 5,657,891 A | 8/1997 | Bilani et al. |
| 5,664,704 A | 9/1997 | Meadows et al. |
| 5,694,885 A | 12/1997 | Deitrich et al. |
| 5,717,202 A | 2/1998 | Matsuda |
| 5,745,041 A | 4/1998 | Moss |
| 5,771,841 A | 6/1998 | Boor |
| 5,780,130 A | 7/1998 | Hansen et al. |
| 5,797,350 A | 8/1998 | Smith |
| 5,823,144 A | 10/1998 | Edstrom et al. |
| 5,832,876 A | 11/1998 | Brown et al. |
| 5,865,144 A | 2/1999 | Semenuk |
| 5,894,816 A | 4/1999 | Coiro, Sr. et al. |
| 5,915,332 A | 6/1999 | Young |
| 5,924,384 A | 7/1999 | Detrich et al. |
| 5,954,013 A | 9/1999 | Gabriel et al. |
| 5,954,237 A | 9/1999 | Lampe et al. |
| 5,996,535 A | 12/1999 | Semenuk et al. |
| 6,021,042 A | 2/2000 | Anderson et al. |
| 6,029,604 A | 2/2000 | de Vosjoli |
| 6,092,487 A | 7/2000 | Niki et al. |
| 6,112,701 A | 9/2000 | Faith et al. |
| 6,138,610 A | 10/2000 | Niki |
| 6,142,732 A | 11/2000 | Chou et al. |
| 6,144,300 A | 11/2000 | Dames |
| 6,158,387 A | 12/2000 | Gabriel et al. |
| 6,164,311 A | 12/2000 | Momont |
| 6,217,437 B1 | 4/2001 | Murray et al. |
| 6,227,146 B1 | 5/2001 | Gabriel et al. |
| 6,237,800 B1 | 5/2001 | Barrett |
| 6,257,171 B1 | 7/2001 | Rivard |
| 6,293,227 B1 | 9/2001 | Ver Hage |
| 6,295,826 B1 | 10/2001 | Lee |
| 6,295,950 B1 | 10/2001 | Deitrich et al. |
| 6,302,059 B1 | 10/2001 | Faith et al. |
| 6,305,324 B1 | 10/2001 | Hallock et al. |
| 6,308,660 B1 | 10/2001 | Coiro, Sr. et al. |
| 6,311,644 B1 | 11/2001 | Pugh |
| 6,336,427 B1 | 1/2002 | Gabriel et al. |
| 6,341,581 B1 | 1/2002 | Gabriel et al. |
| 6,357,393 B1 | 3/2002 | Coiro, Sr. et al. |
| 6,361,962 B1 | 3/2002 | Lentini et al. |
| 6,392,872 B1 | 5/2002 | Doustou et al. |
| 6,394,032 B1 | 5/2002 | Coiro, Sr. et al. |
| 6,396,688 B1 | 5/2002 | Davies et al. |
| 6,407,918 B1 | 6/2002 | Edmunds et al. |
| 6,408,794 B1 | 6/2002 | Coiro, Sr. et al. |
| 6,423,118 B1 | 7/2002 | Becerra et al. |
| 6,457,437 B1 | 10/2002 | Frasier et al. |
| 6,463,397 B1 | 10/2002 | Cohen et al. |
| 6,517,428 B1 | 2/2003 | Murray et al. |
| 6,532,901 B2 | 3/2003 | Isley |
| 6,543,387 B1 | 4/2003 | Stein |
| 6,553,939 B1 | 4/2003 | Austin et al. |
| 6,556,437 B1 | 4/2003 | Hardin |
| 6,571,738 B2 | 6/2003 | Rivard |
| 6,572,819 B1 | 6/2003 | Wu et al. |
| 6,584,936 B2 | 7/2003 | Rivard |
| 6,588,373 B1 | 7/2003 | Strzempko et al. |
| 6,592,448 B1 | 7/2003 | Williams |
| 6,612,260 B1 | 9/2003 | Loyd et al. |
| 6,714,121 B1 | 3/2004 | Moore |
| 6,729,266 B1 | 5/2004 | Gabriel et al. |
| 6,739,846 B2 | 5/2004 | Stoddard et al. |
| 6,810,833 B2 * | 11/2004 | Bonner et al. ................ 119/455 |
| 6,813,152 B2 | 11/2004 | Perazzo |
| 6,853,946 B2 | 2/2005 | Cohen et al. |
| 6,878,874 B2 | 4/2005 | Osborn et al. |
| 6,998,980 B2 | 2/2006 | Ingley, III |
| 7,031,157 B2 | 4/2006 | Horng et al. |
| 7,086,350 B2 | 8/2006 | Tecott |
| 7,114,463 B2 | 10/2006 | Donohoe |

(56) References Cited

U.S. PATENT DOCUMENTS

| | | | |
|---|---|---|---|
| 7,126,471 B2 | 10/2006 | Ahmed | |
| 7,131,398 B2 | 11/2006 | Cohen | |
| 7,146,931 B2 * | 12/2006 | Gabriel et al. | 119/417 |
| 7,191,734 B2 | 3/2007 | Strzempko et al. | |
| 7,237,509 B2 | 7/2007 | Bonner | |
| 7,320,294 B2 | 1/2008 | Irwin et al. | |
| 7,389,744 B2 | 6/2008 | Zhang | |
| 7,487,744 B1 | 2/2009 | Goldberg et al. | |
| 7,527,020 B2 | 5/2009 | Conger | |
| 7,665,419 B2 | 2/2010 | Conger et al. | |
| 7,734,381 B2 | 6/2010 | Conger et al. | |
| 7,739,984 B2 | 6/2010 | Conger | |
| 7,874,268 B2 | 1/2011 | Conger et al. | |
| 7,887,146 B1 | 2/2011 | Louie et al. | |
| 7,913,650 B2 | 3/2011 | Conger et al. | |
| 7,970,495 B2 | 6/2011 | Conger et al. | |
| 8,082,885 B2 | 12/2011 | Conger et al. | |
| 8,156,899 B2 | 4/2012 | Conger et al. | |
| 8,171,887 B2 | 5/2012 | Conger et al. | |
| 8,499,719 B2 | 8/2013 | Brocca et al. | |
| 8,739,737 B2 * | 6/2014 | Conger et al. | 119/419 |
| 2001/0054394 A1 | 12/2001 | Marchioro | |
| 2002/0022991 A1 | 2/2002 | Sharood et al. | |
| 2002/0094283 A1 | 7/2002 | Salmen et al. | |
| 2002/0100429 A1 | 8/2002 | Wade | |
| 2002/0180588 A1 | 12/2002 | Erickson et al. | |
| 2002/0190845 A1 | 12/2002 | Moore | |
| 2002/0195060 A1 | 12/2002 | Dollahan | |
| 2003/0130809 A1 | 7/2003 | Cohen et al. | |
| 2003/0131802 A1 | 7/2003 | Murray et al. | |
| 2003/0170145 A1 | 9/2003 | Smith et al. | |
| 2003/0200933 A1 | 10/2003 | Park | |
| 2004/0018105 A1 | 1/2004 | Stoddard et al. | |
| 2004/0185770 A1 | 9/2004 | Soeholm et al. | |
| 2004/0191437 A1 | 9/2004 | Asayama et al. | |
| 2005/0024211 A1 | 2/2005 | Maloney | |
| 2005/0066908 A1 * | 3/2005 | Park | 119/419 |
| 2005/0076852 A1 | 4/2005 | Campiotti et al. | |
| 2005/0145191 A1 | 7/2005 | Cohen et al. | |
| 2005/0166860 A1 | 8/2005 | Austin et al. | |
| 2005/0193957 A1 | 9/2005 | Oshima et al. | |
| 2005/0241591 A1 | 11/2005 | Ingley, III | |
| 2005/0256591 A1 | 11/2005 | Rule et al. | |
| 2006/0000422 A1 | 1/2006 | Cheng | |
| 2006/0011143 A1 | 1/2006 | Drummond et al. | |
| 2006/0071774 A1 | 4/2006 | Brown et al. | |
| 2006/0111680 A1 | 5/2006 | Spada et al. | |
| 2006/0124072 A1 | 6/2006 | Conger | |
| 2006/0185614 A1 * | 8/2006 | Van Fleet | 119/496 |
| 2006/0236951 A1 | 10/2006 | Gabriel et al. | |
| 2006/0278171 A1 | 12/2006 | Conger et al. | |
| 2007/0011950 A1 * | 1/2007 | Wood | 49/478.1 |
| 2007/0040682 A1 | 2/2007 | Zhu et al. | |
| 2007/0044799 A1 | 3/2007 | Hete et al. | |
| 2007/0159040 A1 * | 7/2007 | Fernandez et al. | 312/348.3 |
| 2007/0169714 A1 | 7/2007 | Conger et al. | |
| 2007/0169715 A1 | 7/2007 | Conger et al. | |
| 2007/0169716 A1 | 7/2007 | Conger et al. | |
| 2007/0169717 A1 | 7/2007 | Conger et al. | |
| 2007/0169718 A1 | 7/2007 | Conger et al. | |
| 2007/0175399 A1 | 8/2007 | Conger et al. | |
| 2007/0175404 A1 | 8/2007 | Conger et al. | |
| 2007/0181070 A1 | 8/2007 | Conger et al. | |
| 2007/0181074 A1 | 8/2007 | Conger et al. | |
| 2007/0181075 A1 | 8/2007 | Conger et al. | |
| 2007/0193527 A1 | 8/2007 | Verhage et al. | |
| 2007/0209653 A1 | 9/2007 | Beisheim et al. | |
| 2007/0256643 A1 | 11/2007 | Coiro et al. | |
| 2008/0066688 A1 * | 3/2008 | Malnati et al. | 119/419 |
| 2008/0078332 A1 | 4/2008 | Conger et al. | |
| 2008/0087231 A1 | 4/2008 | Gabriel et al. | |
| 2008/0134984 A1 | 6/2008 | Conger et al. | |
| 2008/0222565 A1 | 9/2008 | Taylor et al. | |
| 2008/0236506 A1 | 10/2008 | Conger et al. | |
| 2008/0236507 A1 | 10/2008 | Conger et al. | |
| 2009/0002496 A1 | 1/2009 | Esmaeili | |
| 2009/0293815 A1 | 12/2009 | Coiro et al. | |
| 2010/0006521 A1 | 1/2010 | VerHage et al. | |
| 2010/0242852 A1 | 9/2010 | Conger | |
| 2010/0248611 A1 | 9/2010 | Conger | |
| 2011/0005465 A1 | 1/2011 | Tamborini et al. | |
| 2011/0041773 A1 | 2/2011 | Brielmeier et al. | |
| 2011/0061600 A1 | 3/2011 | Conger et al. | |
| 2011/0297098 A1 | 12/2011 | Conger et al. | |
| 2011/0303158 A1 | 12/2011 | Conger et al. | |
| 2011/0308475 A1 | 12/2011 | Conger et al. | |
| 2012/0085291 A1 | 4/2012 | Conger et al. | |
| 2013/0160716 A1 | 6/2013 | Conger et al. | |
| 2013/0220229 A1 | 8/2013 | Conger et al. | |
| 2013/0228134 A1 | 9/2013 | Conger et al. | |
| 2013/0284109 A1 | 10/2013 | Conger et al. | |
| 2014/0123906 A1 | 5/2014 | Conger et al. | |
| 2015/0004679 A1 | 1/2015 | Conger et al. | |

FOREIGN PATENT DOCUMENTS

| | | |
|---|---|---|
| EP | 0279076 | 12/1987 |
| FR | 2696423 A1 | 4/1994 |
| FR | 2824703 A1 | 11/2002 |
| JP | 56-3770 | 1/1981 |
| JP | 57-083233 | 5/1982 |
| JP | 62-7852 | 1/1987 |
| JP | 03-244330 | 10/1991 |
| JP | 4-9555 | 1/1992 |
| JP | 4-023929 | 1/1992 |
| JP | 4-267826 | 9/1992 |
| JP | 05005499 | 1/1993 |
| JP | H06-068430 | 9/1994 |
| JP | 3022196 | 12/1995 |
| JP | 9-168346 | 6/1997 |
| JP | H10-215720 | 8/1998 |
| JP | 10-286037 | 10/1998 |
| JP | H11-009126 | 1/1999 |
| JP | 2000-032862 | 2/2000 |
| JP | 3070623 | 8/2000 |
| JP | 2003-088263 | 3/2003 |
| JP | 2003-018932 | 7/2003 |
| JP | 2005-095004 | 4/2005 |
| JP | 2005-185189 | 7/2005 |
| JP | 2005-328725 | 12/2005 |
| JP | 2008-527975 | 7/2008 |
| JP | 2010-523158 | 7/2010 |
| WO | WO9218084 | 10/1992 |
| WO | WO 93/14474 | 7/1993 |
| WO | WO 01/91543 | 12/2001 |
| WO | WO 02/11523 | 2/2002 |
| WO | WO03051106 A1 | 6/2003 |
| WO | WO03059048 | 7/2003 |
| WO | WO 2006/065773 | 6/2006 |
| WO | WO 2008/127998 | 10/2008 |
| WO | WO 2010/054257 | 5/2010 |
| WO | WO 2012/051124 | 4/2012 |

OTHER PUBLICATIONS

U.S. Appl. No. 11/695,087, filed Apr. 2, 2007, Conger et al.
U.S. Appl. No. 11/695,090, filed Apr. 2, 2007, Conger et al.
U.S. Appl. No. 11/868,877, filed Oct. 8, 2007, Conger et al.
Web Page describing Nalgene animal cage cover printed from VWR Catalogue on world wide web Dec. 5, 2006.
Ancare Catelog, Systems and supplies for Animal Care, Sep. 2006, from World Wide Web URL "ancare.com".
Marketing Materials From Trade Show Distributed Nov. 7, 2005.
International Search Report/Written Opinion for PCT/US2005/44977 mailed: Sep. 30, 2008.
International Search Report/Written Opinion for PCT/US2006/23038 mailed: May, 28, 2008.
International Search Report/Written Opinion for PCT/US2008/059953 mailed: Jul. 16, 2008.
International Search Report/Written Opinion for PCT/US2007/018255 mailed: Jun. 16, 2008.
International Preliminary Report on Patentability for PCT/US2005/044977 mailed: Mar. 5, 2009.

(56) References Cited

OTHER PUBLICATIONS

International Preliminary Report on Patentability for PCT/US2007/018255 mailed: Feb. 26, 2009.
International Search Report and Written Opinion for PCT/US2008/063766 mailed: Sep. 25, 2008.
Claim Translation for Japanese Patent Document JP04-9555. Translation certified: Feb. 5, 2009.
Claim Translation for Japanese Patent Document JP56-3770. Translation certified: Feb. 5, 2009.
Claim Translation for Japanese Patent Document JP62-7852. Translation certified: Feb. 5, 2009.
Statement under 37 C.F.R. section 1.98(a)(3) for Japanese Patent Document JP04-9555. Statemenr made: Feb. 6, 2009.
Statement under 37 C.F.R. section 1.98(a)(3) for Japanese Patent Document JP56-3770. Statemenr made: Feb. 6, 2009.
Statement under 37 C.F.R. section 1.98(a)(3) for Japanese Patent Document JP62-7852. Statemenr made: Feb. 6, 2009.
Office Action mailed on: Nov. 27, 2007 in U.S. Appl. No. 11/695,075, filed Apr. 2, 2007 and published as US 2007-0169717 A1 on Jul. 26, 2007.
Office Action mailed on: Sep. 11, 2008 in U.S. Appl. No. 11/695,075, filed Apr. 2, 2007 and published as US 2007-0169717 A1 on Jul. 26, 2007.
Office Action mailed on: May 26, 2009 in U.S. Appl. No. 11/695,075, filed Apr. 2, 2007 and published as US 2007-0169717 A1 on Jul. 26, 2007.
Office Action mailed on: Oct. 6, 2009 in U.S. Appl. No. 11/695,075, filed Apr. 2, 2007 and published as US 2007-0169717 A1 on Jul. 26, 2007.
Office Action mailed on: Dec. 26, 2007 in U.S. Appl. No. 11/695,085, filed Apr. 2, 2007 and published as US 2007-0169715 A1 on Jul. 26, 2007.
Office Action mailed on: Aug. 25, 2008 in U.S. Appl. No. 11/695,085, filed Apr. 2, 2007 and published as US 2007-0169715 A1 on Jul. 26, 2007.
Office Action mailed on: Apr. 22, 2009 in U.S. Appl. No. 11/695,085, filed Apr. 2, 2007 and published as US 2007-0169715 A1 on Jul. 26, 2007.
Office Action mailed on: Dec. 3, 2007 in U.S. Appl. No. 11/695,089, filed Apr. 2, 2007 and published as US 2007-0169716 A1 on Jul. 26, 2007.
Office Action mailed on: Sep. 3, 2008 in U.S. Appl. No. 11/695,089, filed Apr. 2, 2007 and published as US 2007-0169716 A1 on Jul. 26, 2007.
Office Action mailed on: Mar. 30, 2009 in U.S. Appl. No. 11/695,089, filed Apr. 2, 2007 and published as US 2007-0169716 A1 on Jul. 26, 2007.
Office Action mailed on: Oct. 6, 2009 in U.S. Appl. No. 11/695,089, filed Apr. 2, 2007 and published as US 2007-0169716 A1 on Jul. 26, 2007.
Office Action mailed on: Jun. 2, 2009 in U.S. Appl. No. 11/695,090, filed Apr. 2, 2007 and published as US 2008-0236507 A1 on Oct. 2, 2008.
Office Action mailed on: Dec. 16, 2009 in U.S. Appl. No. 11/695,090, filed Apr. 2, 2007 and published as US 2008-0236507 A1 on Oct. 2, 2008.
International Search report and Written Opinion mailed on: May 28, 2010 in International Application No. PCT/US2009/063638 filed on Nov. 6, 2009 and published as WO 10/054257 on May 14, 2010.
Office Action mailed on: May 18, 2007 in U.S. Appl. No. 11/300,644, filed Dec. 13, 2005 and published as US 2006-0124072 A1 on Jun. 15, 2006 now issued patent 7,527,020 issued on May 5, 2009.
Office Action mailed on: Mar. 11, 2008 in U.S. Appl. No. 11/300,644, filed Dec. 13, 2005 and published as US 2006-0124072 A1 on Jun. 15, 2006 now issued patent 7,527,020 issued on May 5, 2009.
Office Action mailed on: Aug. 1, 2008 in U.S. Appl. No. 11/300,644, filed Dec. 13, 2005 and published as US 2006-0124072 A1 on Jun. 15, 2006 now issued patent 7,527,020 issued on May 5, 2009.
Office Action mailed on: Dec. 30, 2008 in U.S. Appl. No. 11/300,644, filed Dec. 13, 2005 and published as US 2006-0124072 A1 on Jun. 15, 2006 now issued patent 7,527,020 issued on May 5, 2009.
Office Action mailed on: Jan. 26, 2009 in U.S. Appl. No. 11/300,644, filed Dec. 13, 2005 and published as US 2006-0124072 A1 on Jun. 15, 2006 now issued patent 7,527,020 issued on May 5, 2009.
Office Action mailed on: Jan. 19, 2010 in U.S. Appl. No. 11/695,085, filed Apr. 2, 2007 and published as US 2007-0169715 A1 on Jul. 26, 2007.
Office Action mailed on: May 13, 2009 in U.S. Appl. No. 11/423,949, filed Jun. 13, 2006 and published as US 2006-02787171 A1 on Dec. 14, 2006.
Office Action mailed on: Oct. 12, 2010 in U.S. Appl. No. 11/423,949, filed Jun. 13, 2006 and published as US 2006-02787171 A1 on Dec. 14, 2006.
Office Action mailed on: Feb. 3, 2011 in U.S. Appl. No. 11/423,949, filed Jun. 13, 2006 and published as US 2006-02787171 A1 on Dec. 14, 2006.
Office Action mailed on: Mar. 19, 2008 in U.S. Appl. No. 11/695,077, filed Apr. 2, 2007 and published as US 2007-0175399 A1 on Aug. 2, 2007, now abandoned.
Office Action mailed on: Dec. 17, 2007 in U.S. Appl. No. 11/695,078, filed Apr. 2, 2007 and published as US 2007-0169714 A1 on Jul. 26, 2007 now abandoned.
Office Action mailed on Dec. 3, 2007 in U.S. Appl. No. 11/695,092, filed Apr. 2, 2007 and published as US 2007-0181070 A1 on Aug. 9, 2007 now abandoned.
Office Action mailed on Jun. 29, 2009 in U.S. Appl. No. 11/868,877, filed Oct. 8, 2007 and published as US 2008-0134984 A1 on Jun. 12, 2008 now abandoned.
Office Action mailed on: Feb. 2, 2011 in U.S. Appl. No. 12/432,650, filed Apr. 29, 2009 and published as US 2009-0272329 A1 on Nov. 5, 2009.
Office Action mailed on: Nov. 9, 2010 in U.S. Appl. No. 12/432,650, filed Apr. 29, 2009 and published as US 2009-0272329 A1 on Nov. 5, 2009.
Office Action mailed on: Mar. 3, 2010 in U.S. Appl. No. 12/432,650, filed Apr. 29, 2009 and published as US 2009-0272329 A1 on Nov. 5, 2009.
Office Action mailed on: Jun. 17, 2011 in U.S. Appl. No. 11/695,090, filed Apr. 2, 2007 and published as US 2008-0236507 A1 on Oct. 2, 2008.
Office Action mailed on: Jun. 17, 2011 in U.S. Appl. No. 11/695,085, filed Apr. 2, 2007 and published as: 2007/0169715 on Jul. 26, 2007.
Office Action mailed on Oct. 15, 2012 in U.S. Appl. No. 13/218,190, filed Aug. 25, 2011 and published as: 2011/0308475 on: Dec. 22, 2011.
International Search Report/Written Opinion mailed: May 7, 2012 in International Application No. for PCT/US2011/055650 filed on Oct. 10, 2011 and Published as: WO/2012/051124 on: Apr. 19, 2012.
Extended European Search Report dated: Dec. 11, 2012 in European Application No. EP 06773076 filed on: Jun. 13, 2006.
International Search Report/Written Opinion mailed: May 28, 2010 in International Application No. for PCT/US2009/063638 filed Nov. 6, 2009 and Published as: WO/2010/054257 on: May 14, 2010.
International Preliminary Report on Patentability dated: May 10, 2011 in International Application No. for PCT/US2009/063638 filed on Nov. 6, 2009 and Published as: WO/2010/054257 on: May 14, 2010.
National Research Council, Guide for the Care and Use of Laboratory Animals, Washington, D.C.: National Academy Press, 1996.
Canadian Council on Animal Care, Guidelines On, Laboratory Animal Facilities—Characteristics, Design and Development, Ottawa, ON: Canadian Council on Animal Care, 2006.
Web Page describing Nalgene animal cage cover printed on Dec. 5, 2006 from VWR Catalogue on World Wide Web http://www.vwrsp.com.
Wikipedia/pulse-width-modulation (printed from internet http://en.wikipedia.org/wiki/Pulse-width_modulation on Dec. 5, 2009).
Office Action mailed on Nov. 20, 2012 in U.S. Appl. No. 13/218,190, filed Aug. 25, 2011 and published as: 2011/0308475 on: Dec. 22, 2011.

(56) References Cited

OTHER PUBLICATIONS

Office Action mailed on Nov. 7, 2012 in U.S. Appl. No. 13/101,054, filed May 4, 2011 and published as: 2011/0297098 on: Dec. 8, 2011.
Office Action mailed on: Mar. 28, 2012 in U.S. Appl. No. 11/695,085, filed Apr. 2, 2007 and published as: 2007/0169715 on Jul. 26, 2007.
Office Action mailed on: Dec. 29, 2011 in U.S. Appl. No. 11/695,090, filed Apr. 2, 2007 and published as US 2008-0236507 A1 on Oct. 2, 2008.
Office Action mailed on Dec. 22, 2011 in U.S. Appl. No. 13/218,190, filed Aug. 25, 2011 and published as: 2011/0308475 on: Dec. 22, 2011.
Office Action mailed on Dec. 22, 2011 in U.S. Appl. No. 13/218,227, filed Aug. 25, 2011 and published as: 2011/0303158 on: Dec. 15, 2011.
Office Action mailed on Mar. 19, 2012 in U.S. Appl. No. 13/218,227, filed Aug. 25, 2011 and published as: 2011/0303158 on: Dec. 15, 2011.
Office Action mailed on Dec. 22, 2011 in U.S. Appl. No. 13/101,054, filed May 4, 2011 and published as: 2011/0297098 on: Dec. 8, 2011.
Office Action mailed Sep. 18, 2013 in U.S. Appl. No. 13/775,080, filed Feb. 22, 2013 and published as US 2013/0160716 on Jun. 27, 2013.
Office Action mailed on Sep. 19, 2013 in U.S. Appl. No. 12/614,291, filed Nov. 6, 2009 and published as US 2010-0242852 on Sep. 30, 2010.
Office Action dated Nov. 26, 2013 in U.S. Appl. No. 12/377,591, filed Nov. 23, 2010 and published as US 2011-0061600 on Mar. 17, 2011.
Office Action dated Dec. 5, 2013 in U.S. Appl. No. 13/771,015, filed Feb. 19, 2013 and published as US 2013-0220229 on Aug. 29, 2013.
Office Action dated Jan. 3, 2014 in U.S. Appl. No. 13/594,703, filed Aug. 24, 2012 and published as US 2012-0318207 on Dec. 20, 2012.
Office Action mailed on Oct. 18, 2013 in U.S. Appl. No. 13/270,165, filed Oct. 10, 2011 and published as US 2012-0085291 on Apr. 12, 2012.
Office Action mailed on Oct. 18, 2013 in U.S. Appl. No. 13/776,645, filed on Feb. 25, 2013 and published as US 2013-0228134 on Sep. 5, 2013.
Office Action mailed: May 23, 2013 in U.S. Appl. No. 12/377,591, filed Feb. 13, 2009 and published as: 2011/0061600 on: Mar. 17, 2011.
Office Action mailed: May 24, 2013 in U.S. Appl. No. 13/594,703, filed Aug. 24, 2012 and published as: 2012/0318207 on: Dec. 20, 2012.
Office Action mailed: Jun. 26, 2013 in U.S. Appl. No. 13/771,015, filed Feb. 19, 2013 and published as US 2013/0220229 on Aug. 29, 2013.
Office Action mailed: Aug. 2, 2013 in U.S. Appl. No. 13/775,080, filed Feb. 22, 2013 and published as US 2013/0160716 on Jun. 27, 2013.
Office Action mailed on Oct. 31, 2014 in U.S. Appl. No. 13/270,165, filed Oct. 10, 2011 and published as US 2012-0085291 on Apr. 12, 2012.
Office Action mailed on Nov. 13, 2014 in U.S. Appl. No. 13/776,645, filed Feb. 25, 2013 and published as US 2013-0228134 on Sep. 5, 2013.
Office Action mailed on Feb. 24, 2014 in U.S. Appl. No. 12/614,291, filed Nov. 6, 2009 and published as US 2010-0242852 on Sep. 30, 2010.
Office Action mailed on May 6, 2014 in U.S. Appl. No. 13/270,165, filed Oct. 10, 2011 and published as US 2012-0085291 on Apr. 12, 2012.
Office Action mailed May 16, 2014 in U.S. Appl. No. 13/775,080, filed Feb. 22, 2013 and published as US 2013/0160716 on Jun. 27, 2013.
Office Action dated Jun. 6, 2014 in U.S. Appl. No. 12/377,591, filed Nov. 23, 2010 and published as US 2011-0061600 on Mar. 17, 2011.
Office Action dated Jun. 18, 2014 in U.S. Appl. No. 13/771,015, filed Feb. 19, 2013 and published as US 2013-0220229 on Aug. 29, 2013.
Office Action dated Jun. 19, 2014 in U.S. Appl. No. 13/594,703, filed Aug. 24, 2012 and published as US 2012-0318207 on Dec. 20, 2012.
Office Action mailed on Jun. 20, 2014 in U.S. Appl. No. 13/776,645, filed Feb. 25, 2013 and published as US 2013-0228134 on Sep. 5, 2013.
Extended European Search Report dated Jul. 23, 2014 in European Application No. EP 07811401.4-1655, filed on Aug. 17, 2007 and published as EP 2 059 121 on May 20, 2009.
International Search Report and Written Opinion mailed on Nov. 11, 2014 in International Application No. PCT/US2014/044668, filed on Jun. 27, 2014 and published as WO 2015/002843 on Jan. 8, 2015.
Office Action mailed on Dec. 23, 2014 in U.S. Appl. No. 13/776,671, filed Feb. 25, 2013 and published as US 2014-0123906 on May 8, 2014.
Office Action dated Jan. 15, 2015 in U.S. Appl. No. 13/775,080, filed Feb. 22, 2013 and published as US 2013-0160716 on Jun. 27, 2013.
Office Action dated Feb. 20, 2015 in U.S. Appl. No. 13/771,015, filed Feb. 19, 2013 and published as US 2013-0220229 on Aug. 29, 2013.
Office Action mailed on: Mar. 28, 2012 in U.S. Appl. No. 11/695,085 filed on Apr. 2, 2007 and published as: 2007/0169715 on Jul. 26, 2007 (Examiner: Joshua Michener).
Office Action mailed on: Dec. 29, 2011 in U.S. Appl. No. 11/695,090 filed on Apr. 2, 2007 and published as US 2008-0236507 A1 on Oct. 2, 2008, (Examiner: Joshua Michener).
Office Action mailed on Dec. 22, 2011 in U.S. Appl. No. 13/218,190.
Office Action dated Feb. 26, 2015 in U.S. Appl. No. 13/931,336, filed on Jun. 28, 2013 and published as US 2013-0284109 on Oct. 31, 2013 (Examiner: Lisa L. Tsang).
Office Action dated Mar. 20, 2015 in U.S. Appl. No. 12/377,591, filed on Nov. 23, 2010 and published as US 2011-0061600 on Mar. 17, 2011 (Examiner: Shadi Shunti Baniani).

* cited by examiner

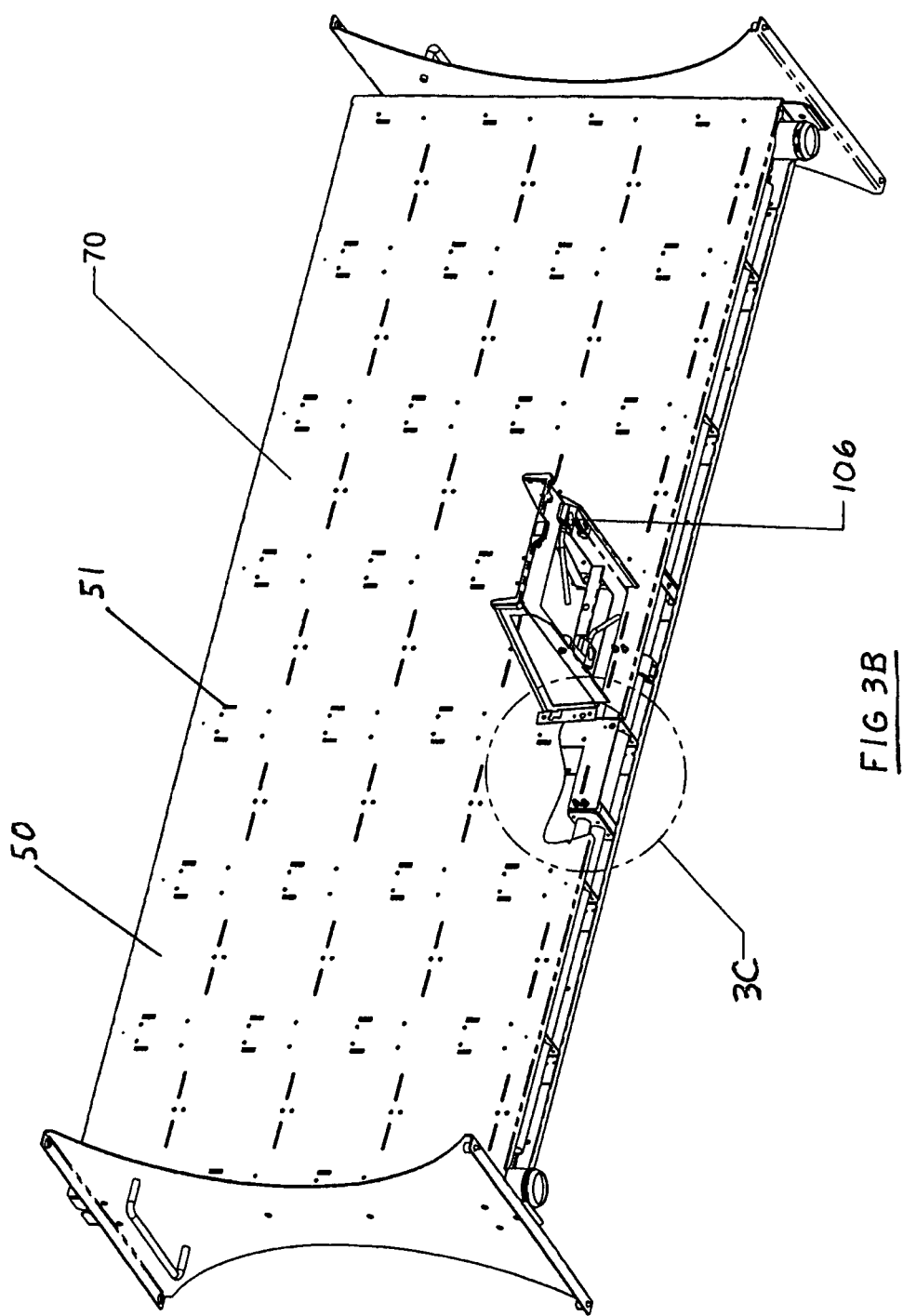

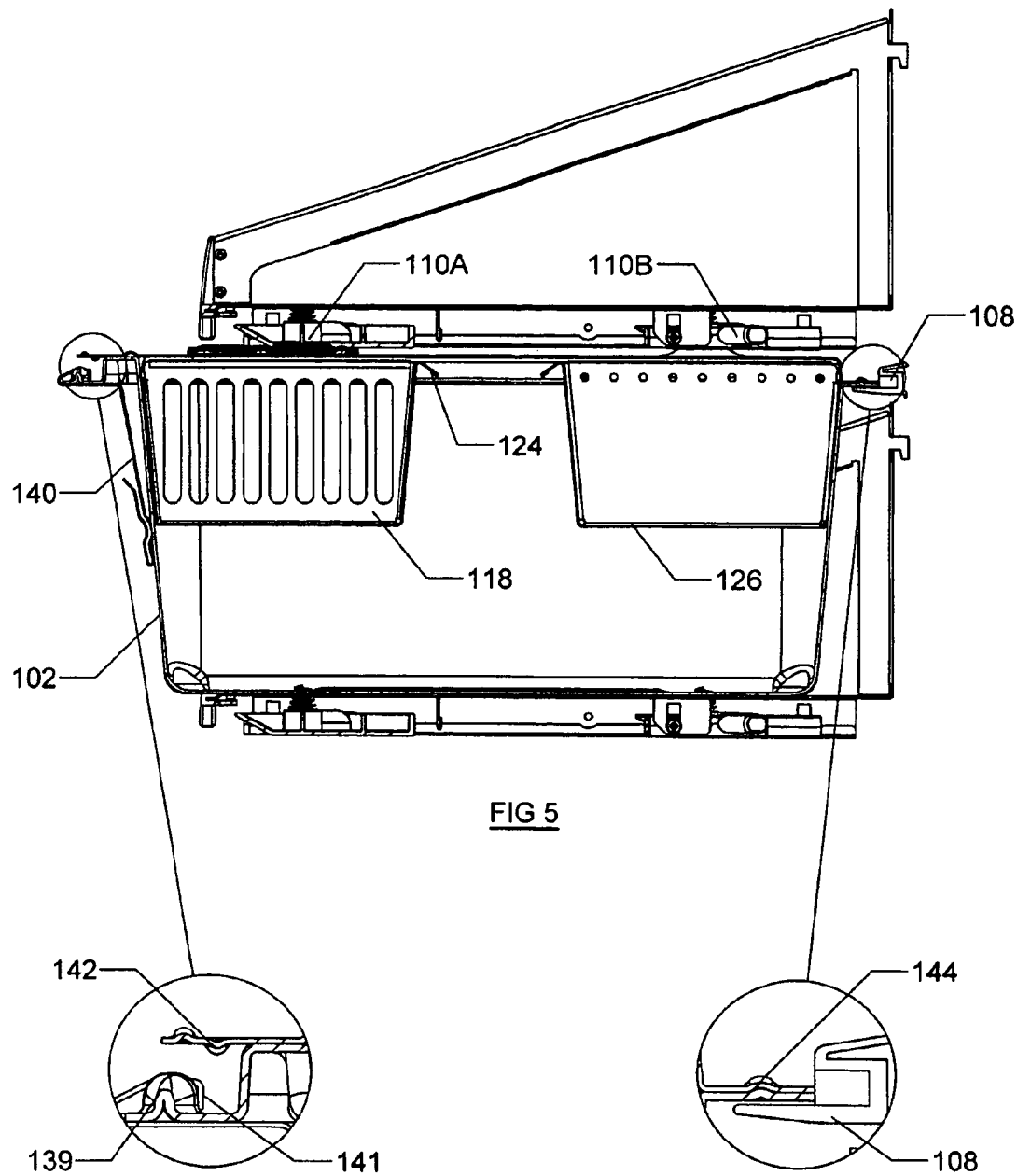

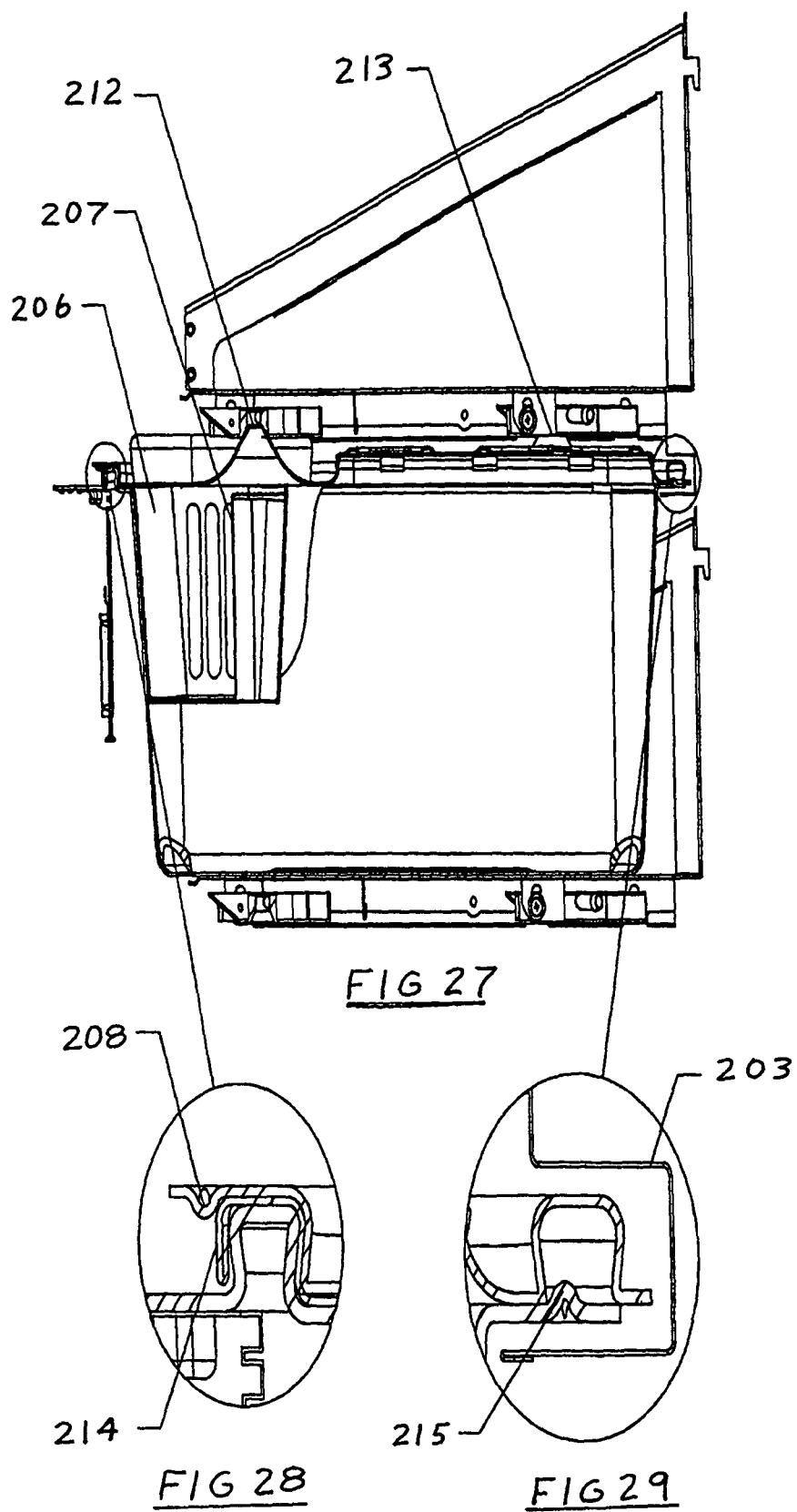

ANIMAL HUSBANDRY DRAWER CAGING

RELATED APPLICATIONS

This application claims priority under 35 U.S.C. section 119(e) from U.S. Provisional Patent Application Ser. No. 60/911,271, filed Apr. 11, 2007, naming Dee L. Conger, Thomas M. Perazzo, Francesca McGuffie, and Matthew D. d'Artenay as inventors, titled "Animal Husbandry Drawer Caging Systems and Components" and from U.S. Provisional Patent Application Ser. No. 60/979,721, filed Oct. 12, 2007, naming Dee L. Conger and Thomas M. Perazzo as inventors, titled "Animal Husbandry Drawer Caging" both of which are incorporated by reference herein in their entirety.

This application is related to U.S. Provisional Patent Application Nos. 60/635,756, 60/690,811 and 60/717,826 filed on 13 Dec. 2004, 14 Jun. 2005 and 16 Sep. 2005, respectively, entitled "Animal Containment Systems And Components," naming Thomas Perazzo and Dee Conger as inventors. This application is also related to U.S. Provisional Patent Application Nos. 60/734,229 and 60/734,189, each filed on 7 Nov. 2005, entitled "Containment Systems And Components For Animal Husbandry," naming Thomas Perazzo and Dee Conger as inventors respectively. This application is also related to U.S. Provisional Patent Application No. 60/804,554 filed on 12 Jun. 2006, entitled "Containment Systems And Components For Animal Husbandry," naming Dee Conger et al. as inventors. This application is also related to U.S. Provisional Patent Application Nos. 60/822,755 and 60/822,914 filed on 17 Aug. 2006 and 18 Aug. 2006, entitled "Containment Systems And Components For Animal Husbandry," naming Dee Conger et al. as inventors respectively. This application is also related to U.S. patent application Ser. No. 11/300,664 filed on 13 Dec. 2005, International Patent Application No. PCT/US2005/044977 filed on 13 Dec. 2005, U.S. patent application Ser. No. 11/423,949 filed on Jun. 13, 2006, and International Patent Application No. PCT/US2006/023038, each entitled "Containment Systems And Components For Animal Husbandry," each naming Dee Conger et al. as inventors, respectively, International Patent Application No. PCT/US2007/018255, filed Aug. 17, 2007, naming Dee L. Conger, Thomas M. Perazzo, Matthew D. d'Artenay and Francesca McGuffie as inventors, entitled "Containment Systems and Components for Animal Husbandry". Each of the foregoing patent applications is incorporated herein by reference in its entirety.

FIELD OF THE INVENTION

The invention pertains to the field of animal husbandry and to animal containment.

BACKGROUND

Animal containment systems are utilized in a variety of applications, such as for animal transportation, breeding and maintenance. Animals contained in the systems often are laboratory animals such as rodents, and such animals often are contained in a vivarium. Containment systems may include animal cages in which the animals are housed and a rack unit onto which cages are mounted. Animals contained in such systems emit several gaseous and particulate contaminates that are health risks to housed animals and human personnel maintaining the systems. Generally, permanent or multiple-use cages are designed for multiple uses, which requires they are washed and sterilized about every week for two years or more in an animal containment facility, for example, especially in a facility practicing Good Laboratory Procedures (GLPs). Multiple-use cages generally are heavy and have relatively thick walls and components often are constructed from resilient materials that can withstand multiple washes and sterilizations. Such cages may be disposed in a rack that holds multiple cages in order to house the animals more efficiently, however, it may be inconvenient to remove the cages from such rack in order to perform cleaning and other maintenance work.

Due to these aspects of typical multiple-use animal containment systems, a significant portion of animal containment resources are required for washing and sterilizing multiple-use components. Multiple-use cage designs also can present disadvantages with respect to contamination, such as requiring contaminated air filter handling or exposure of cage components to the environment when a cage impacts a surface (e.g., a cage is dropped by a user or falls from an elevation), for example, which bear especially on handling of animals in higher biosafety level animal facilities.

As such, what has been needed are animal containment cages and systems that eliminate the need for regular washing of cages, provide a safe and healthy environment for contained animals and optionally provide an efficient means for housing a large number of animals in a limited space. What has also been needed are such animal containment cages and systems that allow for easy access to the contained animals by laboratory personnel or anyone else that may need to access contained animals.

SUMMARY

Some embodiments of a disposable drawer containment cage assembly for animal containment include a base having four sides and a bottom portion having a substantially continuous rectangular structure and having lid contact members disposed substantially parallel to each other at an upper rim on opposite sides of the base. The assembly also includes a lid having a generally planar configuration with channel members which are disposed parallel to each other at opposite sides of the lid and which are configured to slidingly engage the lid contact members of the base while maintaining the base vertically secured to the lid.

Some embodiments of a method of accessing an interior volume of a disposable drawer containment cage assembly includes providing a drawer containment cage assembly. The cage assembly includes a base having four sides and a bottom portion having a continuous rectangular structure and having lid contact members disposed substantially parallel to each other at an upper rim on opposite sides of the base. The cage assembly also includes a lid having a generally planar configuration with channel members which are disposed parallel to each other at opposite sides of the lid and which are configured to slidingly engage the lid contact members of the base while maintaining the base vertically secured to the lid. Once provided, the base is slid outward relative to the lid so as to create an opening between the front edge of the lid and front edge of the base with the base still vertically secured to the lid. Thereafter, the interior volume of the cage assembly is accessed through the opening.

Some embodiments of a rack system for mounting a plurality of drawer containment cage assemblies includes a frame assembly having a wall portion and at least one shelf assembly secured to the wall portion and including a shelf. The shelf assembly also includes at least one carriage assembly which is disposed in functional arrangement with the at least one shelf. The carriage assembly includes a carriage body having a nozzle in communication with a ventilation system and configured to releasably engage a receptacle of a containment cage disposed on the shelf assembly, a spring bias member configured to exert a spring bias on the carriage body towards a receptacle and a support frame system with the carriage body mounted to the support frame system so as to allow limited transverse movement of the carriage body and nozzle relative to the shelf and support structure.

Some embodiments of a disposable drawer containment cage assembly include a base having four sides and a bottom portion having a substantially continuous rectangular structure. The base also has lid contact members disposed substantially parallel to each other at an upper rim on opposite sides of the base. The cage assembly also includes a lid having a generally planar configuration with channel members which are disposed parallel to each other at opposite sides of the lid and which are configured to slidingly engage the lid contact members of the base while maintaining the base vertically secured to the lid. A perforated food tray including a high strength material resistant to chewing by contained animals may be disposed under the first ventilation receptacle when the cage is in a closed state such that the food tray prevents access to the first ventilation receptacle with the cage in a closed state. A perforated water bottle tray including a high strength material resistant to chewing by contained animals may be disposed under the second ventilation receptacle when the cage is in a closed state such that the water bottle tray prevents access to the second ventilation receptacle with the cage in a closed state.

These features of embodiments will become more apparent from the following detailed description when taken in conjunction with the accompanying exemplary drawings.

BRIEF DESCRIPTION OF THE DRAWINGS

FIG. 3B is a perspective view of an embodiment of a rack module.

FIG. 5 is a side view in partial section of the containment cage assembly of FIG. 1.

FIG. 6 is an enlarged view in section of a front edge of the containment cage of FIG. 5.

FIG. 7 is an enlarged view in section of the rear edge of the containment cage of FIG. 5.

FIG. 27 is an elevation view in partial section of the containment cage assembly of FIG. 23.

FIG. 28 is an enlarged view in section of a front edge of the containment cage of FIG. 27.

FIG. 29 is an enlarged view in section of the rear edge of the containment cage of FIG. 27.

DETAILED DESCRIPTION

Figure 1:
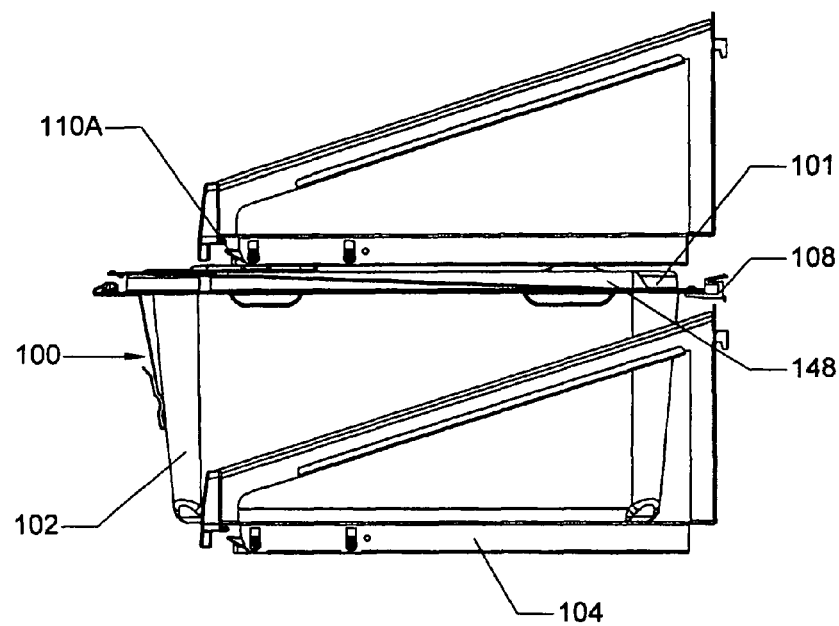
FIG. 1 is a side view of a containment cage assembly having a base which is configured to slide open relative to the lid shown in a closed state and disposed in a shelf of a rack system.

Provided herein are animal containment systems that allow easy and convenient access to contained animals and may include disposable, single-use components, which do not require washing and sterilization by laboratory personnel. The animal containment systems and components may be used for transportation of animals and may be used for containment of animals for research and breeding, for example. Cages of such systems often include relatively thin walls constructed from a polymer. Features of cage embodiments discussed herein may substantially reduce or prevent the possibility that contained animals will damage the relatively thin polymeric material (e.g., gnawing damage). The low weight and relative flexibility of single-use cages, as compared to thicker, rigid multiple-use cages, provide for cages less prone to breakage or disassembly upon impact. These features reduce the likelihood that cage contents (e.g., animals, animal contaminants and any harmful substances in the cage) are exposed to the outside environment upon impact (e.g., cage bases and lids remain sealed after impact).

Some cage embodiments and associated components also may be efficiently nested, thereby advantageously reducing required storage space. Ventilated system embodiments provided herein may be configured to efficiently exchange air in cages and efficiently maintain temperature within cages. Such ventilated systems may be operated at relatively high air pressures and without adjustable valves, providing for airflow and air pressure uniformity and efficient airflow control across a range of air pressures. Also provided are animal containment systems that comprise modular components, often components that are readily disassembled. In some embodiments, rack units include one or more attachable and detachable rack modules that are readily disassembled for washing of the rack modules. These and other features of the components disclosed herein can reduce the amount of resources required for animal containment, can enhance quality of care afforded to the housed animals, and can minimize health risks to human personnel who care for or study the contained animals.

Some animal containment cage embodiments may include a containment cage base member, a cover or lid member, and an optional insertion member or device. An animal cage base sometimes is provided separately from a lid, the lid often may be attached to the cage base and the lid may be readily detachable from the base. An animal, such as a rodent, and/or optional insertion member may be placed in a cage base before a lid is attached. A variety of animals may be contained within cage embodiments described herein. Rodents often are contained within such units, including but not limited to mice, rats, hamsters, gerbils, guinea pigs, chinchillas and rabbits. The animal can be transgenic, inbred, immunodeficient, lack one or more functional genes (e.g., knock-out animal), and/or can include one or more xenografts. Examples of immunodeficient mice include nude mice and severe combined immune deficiency (SCID) mice. Cells from cultured cell lines, cultured primary cells or directly from another animal or tissue (e.g., biopsy) may be utilized for xenografts (e.g., cancer cells from a human). The animals contained in cages and systems described herein can be utilized in a variety of manners, including but not limited to studying cancer and other diseases, assessing parameters of potential drugs (e.g., toxicity, efficacy, maximum tolerated doses, effective doses and other pharmacokinetic parameters), producing and isolating antibodies and producing and isolating cells useful for preparing hybridomas, for example.

Cage base embodiments may be of any geometry suitable for housing animals, such as cylindrical, substantially cylindrical, conical, rectangular, square, cubic, rhomboid and the like, for example. Cage base embodiments may include a bottom member that supports a plurality of sides or sidewall members (e.g., four sidewall members). One sidewall member often is referred to as the "front sidewall member" and the opposite sidewall member often is referred to as the "rear sidewall member." Opposing sidewall members sometimes are parallel, substantially parallel, not parallel, rhomboid, substantially rhomboid or a combination thereof. In some embodiments, opposing sidewalls are not parallel, and are not vertical with respect to the bottom. In such embodiments, a sidewall, and sometimes all sidewalls, are at a non-90 degree angle with respect to the bottom, such as an angle between about 91 degrees and about 105 degrees, an angle of about 92 degrees to about 98 degrees or an angle of about 95 degrees, for example. Such angled sidewall configurations (with respect to the bottom) can promote cage base nesting (described in greater detail hereafter).

Each edge junction or corner junction of a wall or walls and/or the bottom may have a geometry convenient for manufacture and use, such as a sharp edge, smooth edge or rounded edge. It has been determined that certain corner and edge geometries in animal containment components reduce or eliminate the possibility of damage caused by animal residents (e.g., gnawing damage by rodents). This resistance to damage caused by contained animals may be especially applicable to single-use containment components having thin polymer walls (e.g., about 0.01 inches to about 0.08 inches). Damage resistant edge and corner orientations have been determined based upon a combination of (i) angle of edge or corner surfaces (in degrees) and (ii) edge or corner radius (in inches). The angle alpha between two surfaces is measured from the side of the surfaces on which an animal resides. When alpha is less than 180 degrees, the edge or corner minimum radius may be zero. When alpha is between 180 degrees and 360 degrees, a minimum radius can be determined by the following equation:

$$\text{minimum radius} = 0.25/(\tan((pi/360)(360-\text{alpha}))).$$

For example, minimum edge and corner radii of 0.02, 0.04, 0.07, 0.09, 0.12, 0.14, 0.18, 0.21, 0.25, 0.30, 0.36, 0.43, 0.54, 0.69, 0.93, 1.42, 2.86 and 5.73 inches often are incorporated when the corresponding angle alpha is 190, 200, 210, 220, 230, 240, 250, 260, 270, 280, 290, 300, 310, 320, 330, 340, 350 and 355 degrees, respectively, in accordance with this relation. Thus, provided are edge and corner angle/minimum radius combinations in accordance with the above relation.

Cage base embodiments may include rounded junctions of a suitable radius, which can minimize damage caused by gnawing or clawing of housed animals, for example. Thus, in some embodiments, bottom corners, each formed at the junction of a bottom and two sidewalls, often are not sharp corners and often are smooth corners defined by a radius. Each corner in some embodiments may be effectively split into multiple edges which may improve crumple resistance to impact. Crumple resistance to impact provides benefits of maintaining nesting efficiency, reducing potential damage caused by animal gnawing (e.g., impact can crumple a corner and introduce a sharp edge on which an animal may gnaw), and maintaining cage integrity upon impact (e.g., not exposing the cage interior to the outside environment). In certain embodiments, a corner may be effectively split into 10, 9, 8, 7, 6, 5, 4 3 or 2 corners, each often defined by a radius.

A top edge of one or more sidewall members often is contiguous with a flange or rim portion that extends, often vertically, from the outer surface of the sidewall member. The flange sometimes forms a continuous surface around the top perimeter of the cage and its surface often is horizontal when a bottom member of the cage rests on a horizontal surface. The flange may be any suitable width, sometimes about 0.03 inches to about 1 inch. The flange can increase cage base rigidity and sometimes is configured to mate with a portion of a lid member, described further herein. In some embodiments, the flange includes an optional downward extending lip member, which sometimes mates with a corresponding member of a lid to form a detachable seal. The profile of the lip member of the base is of any shape to allow a fit with a corresponding structure on the lid, where the profile sometimes is curved, and sometimes is S-shaped, V-shaped or J-shaped. The lip member and/or flange member of the cage base sometimes are shaped to deflect when mated with a lid member to form a seal between the cage base and the lid. A seal between cage base embodiments and lid embodiments, which may be partial, may be of any convenient or useful type, including but not limited to an adhesive seal, compression fit or interference fit, for example. Some cage embodiments do not require or include a seal between the cage base and lid.

A cage base sometimes includes one or more indents in a sidewall member that extends towards the interior of the cage base. One, two, three, four or more sidewalls sometimes include one or more indents, which can increase sidewall rigidity. Sidewall integrity enhancement can provide an advantage of increasing impact resistance to crumpling, advantages of which are described above. The depressed surface area of an indent can be trapezoidal or rectangular. The depressed distance of the indent vertical from a sidewall from which the indent extends often is continuous from the top of the indent to the bottom (e.g., the face is parallel to the side wall from which the indent is extended), and may be greater at the top of the indent, sometimes tapering from the top portion of the indent to the bottom portion. Such configurations allow for nesting of cage bases when they are not housing an animal, as described hereafter.

A cage base may include one or more mounts located on an outside surface of a sidewall member or bottom member, which may be referred to as "outer support members" or "outer guide members," which allow for convenient mounting of the cage into a rack unit. The outer support members or outer guide members are of any configuration allowing for mounting of the cage base into a rack unit member or shelf, and sometimes mate with or are supported by corresponding members in a rack unit embodiment. In some embodiments, a flange member contiguous with the top of one or more sidewall members serves as a guide member and/or support member.

In certain embodiments, a guide member and/or support member is a flange, projection, rib or groove located on the exterior surface of a bottom member of a base and/or one or both cage sidewall members (e.g., sidewall member adjacent to the front sidewall and rear sidewall), and often may be parallel with the top edges of the sidewall members. Such guide members and support members sometimes extend from the front edge of a sidewall member, sometimes extend to the rear edge of a sidewall member, sometimes extend from a point in a sidewall member a distance from the front edge, and sometimes extend to a point in a sidewall member a distance from the rear edge. Such members sometimes are oriented in the middle half of the vertical length of a sidewall member, and sometimes are oriented in the middle of the vertical length. In some embodiments, guides are low profile, and sometimes are grooves or depressions, that do not substantially interfere with nesting of cage bases.

Some cage base embodiments may be manufactured from any material suitable for housing an animal, such as a small rodent, for a time period of about one week or greater. The material may be rigid, and often is a semi-rigid or flexible material. The cage base sometimes is constructed entirely, or in part, from a translucent or transparent material. Examples of materials that may be utilized for manufacture of any of the a cage base or lid embodiments discussed herein include, but are not limited to, polypropylene (PE), high-density polyethylene, low-density polyethylene, polyethylene teraphthalate (PET), polyvinyl chloride (PVC), polyethylenefluoroethylene (PEFE), polystyrene (PS), high-density polystryrene, acrylonitrile butadiene styrene copolymers and the like. In certain embodiments, a cage is constructed from PET or PS (e.g., high density PS).

Sidewall members and bottom members of cage base embodiments may be of any thickness for substantially maintaining cage integrity for about one, two, three or four or more weeks of animal containment, and the thickness sometimes is about 0.01 inches to about 0.08 inches. The sidewalls often are of substantially uniform thickness. A cage base often is manufactured as a single unit and by any convenient process, sometimes in an injection molding, thermoforming or vacuum forming process, for example. A cage base often is packaged for shipment, sometimes as a single unit and sometimes with other like units (e.g., as a nested set described hereafter). A cage base sometimes is washed and/or sterilized (e.g., U.V. irradiation, gamma irradiation) prior to packaging. Cage bases may be packaged in any material, including but not limited to materials containing polystyrene, polyvinyl chloride, low-density polyethylene and the like.

Some embodiments of a cage base floor may be about 60 square inches to about 90 square inches, and sometimes about 75 square inches, for some embodiments. The height of such cages sometimes is about 4 inches to about 6 inches and sometimes about 5 inches. In a specific embodiment, wall junction radii are about 1 inch, and sometimes 1.06 inches. In some embodiments, the cage is constructed from PET and weighs about 110 grams to about 150 grams, and sometimes is about 130 grams (e.g., 130.4 grams). For rat cage bases, the cage floor sometimes is about 130 square inches to about 150 square inches, and sometimes is about 140 square inches. The height of such cages sometimes is about 5 inches to about 9 inches, and sometimes is about 7 inches.

A cover or lid may be provided separately from a cage base, often reversibly mates with a cage base, sometimes in sealing attachment, and may be of any suitable geometry allowing for attachment to base embodiments, including sliding attachment. Some lid embodiments may include one or more members that directly mate with and seal with one or more members of a base; sometimes has no side wall members; and sometimes is planar or substantially planar. Some lid embodiments may be constructed from any material that allows for animal containment for about one week or greater. Materials for constructing a lid sometimes are selected to allow for sealing or partial sealing attachment to a cage base. Examples of materials from which lid embodiments may be constructed include those described above for cage base embodiments. Sometimes the lid and base are constructed from the same material and sometimes are of a similar or the same thickness as a thickness of a corresponding base.

Some lid embodiments may be flexible or semi-rigid and include a substantially planar region and a flange region. The substantially planar region may include one or more components described herein. A flange region of lid embodiments sometimes is embossed, may be raised and may includes a region that extends downwards as a lip (referred to herein as a "lip"). A flange and optional lip region may extend continuously around the perimeter of lid embodiments. The profile of the flange and optional lip often correspond to a flange and optional lip on a cage base, and may allow the lid to seal or partially seal with some base embodiments. The flange and optional lip may include any suitable shape to fit with corresponding base embodiments, and sometimes are S-shaped, V-shaped, J-shaped and U-shaped, upwards or inverted, for example.

Some lid embodiments may include one or more of a continuously solid surface, an imperforate surface region, and/or a perforated surface region (e.g., a region containing air holes or a grid structure). A lid member sometimes includes, sometimes within a substantially planar region, an aperture, a groove, a channel, a depressed or indented region, a bossed region, a rib (e.g., an embossed rib or solid rib), and sometimes a combination of the foregoing. Such a structure or structures may be located near a heavier structure in the lid, such as around or near a water supply receptacle or a connector that receives a corresponding non-lid connector. A lid member sometimes includes other components, such as a filter, a baffle, a feeding structure, and/or a watering structure, holders of the foregoing, and combinations of the forgoing, where each structure is integral or provided as a component separate from the lid member. Edges or corners in a lid may be rounded or otherwise defined by a radius and/or angle as described herein for cage base embodiments. A lid in certain embodiments may be rigid. A lid member may comprise a combination of a flexible region with a rigid or semi-rigid region, the rigid or semi-rigid region sometimes acting as a frame that allows a lid to be handled efficiently and conveniently when securing it to a cage base, for example. Lid embodiments, or a portion or portions thereof, may be translucent or transparent.

Lid embodiments may sometimes include one or more air filters. Such air filters often are configured to filter components (e.g., particulates) in air exiting an interior volume of a cage. Some filter embodiments may be composed of any filter material useful for housing animals, including but not limited to spunbonded polyester, pressed pulp (depth filter), a Reemay filter (e.g., Reemay 2024), high-efficiency particulate air (HEPA) filter and the like (e.g., U.S. Pat. No. 6,571, 738). Filter embodiments may be configured to exclude or otherwise filter out particles which are about 1 micron to about 5 microns in size, more specifically, about 0.3 microns to about 1 micron in size. The filter often is in effective connection with a portion of the surface area of a lid member, and often only a portion or fraction of the surface area of the lid member. In some embodiments, the filter may be in effective connection with 80% or less, 70% or less, 60% or less, 50% or less, 40% or less, 30% or less, 25% or less, or 20% or less of the lid member surface area. Filter embodiments sometimes are integrated with the lid (e.g., the filter is not reversibly mounted to the lid member), and may be provided separately from the lid. When provided separately from the lid, a filter often is placed in effective connection with a portion of the lid, often a perforated portion of the lid (e.g., a portion having air apertures or a grid structure).

A filter may be affixed to a lid in any suitable manner, often by reversible attachment and/or sealing attachment, and in some embodiments, filter embodiments may include an adhesive, sometimes on the outer perimeter of the filter, sometimes across the entire surface area of the filter, and often on one side of the filter. Where the filter includes an adhesive, it sometimes is provided with a peel-off backing that exposes the adhesive, and the adhesive often allows for reversible adhesion (e.g., the filter can be affixed, removed or partially peeled back from the lid, and then affixed again, which can be repeated multiple times). Filter embodiments may be secured to a lid by a manufacturer of the lid, and/or may be attached/detached by a user. In some embodiments, filter embodiments may be in connection with a flexible film, the latter of which is coated on a surface (e.g., the entire surface or a portion of the surface) with an adhesive. When an adhesive is utilized, it often is not substantially toxic to animals housed in the cage and sometimes is a food grade adhesive. The filter and/or film often may be disposed adjacent to or in effective connection with one or more apertures of the lid.

In certain embodiments, a filter may be sandwiched between the lid and a holding member attached to the lid. The holding member often includes one or more apertures through which air may flow, and the holding member often is sealingly attached to the lid (e.g., attached by an adhesive). In such embodiments, a substantial surface area of the filter often is not in direct contact with the holding member, which may provide an advantage of reducing potential gnawing damage caused by a contained animal (such a holding member also is referred to herein as a "filter shield"). Standing an air filter away from surfaces of the lid and optional filter shield(s) provides certain advantages, such as permitting efficient airflow and protecting filter material from possible damage caused by contained animals (e.g., animals cannot effectively contact the filter). For example, some filter embodiments may have a pore size of about 0.5 microns and there may be approximately 1000 pores per inch. The corresponding percentage of open area for this type of filter may be about 2%.

A relatively large filter surface may be utilized in some embodiments to permit airflow through the filter without significant restriction or pressure drop. Filter dimensions in the lid sometimes are about six (6) inches by about two (2) inches. The resulting area available to airflow for a filter of these dimensions may be about 12 square inches multiplied by 2%. The area available to airflow would be significantly limited by exhaust apertures in the lid if the filter paper were in direct contact with the lid (e.g., the area available to flow is that of the area of the apertures, which can be (the square of 0.125/4 multiplied by 27 holes multiplied by 2%). Thus, standing a filter away from apertures in the lid and optional filter shield(s) can significantly enhance airflow by allowing the entire filter paper to breathe.

Characteristics of cages provided herein may contain cage components when the cages are exposed to physical impact. For example, combinations of (i) sliding attachment of a cage base to a lid, (ii) light weight of the cage base and lid resulting from thin walls, (iii) flexibility of the semi-rigid base and lid, and (iv) base corner geometry (e.g., effectively split into more than one corner), may be configured to reduce the possibility that cage contents (e.g., animals, animal waste and cage additives) are exposed to the outside environment as compared to reusable, rigid cages. In the event a cage is exposed to impact (e.g., dropped or falls to a floor from an elevated position) these features may protect contained animals from the exterior environment and protect personnel from cage contents. These features may be desirable for application in higher biosafety level environments, for example.

Lid embodiments may sometimes include a substance that scavenges emissions from an animal in the cage. Emissions sometimes are gaseous or particulate compositions, such as those resulting from exhalation (e.g., water vapor, carbon dioxide), urination and defecation (e.g., ammonia, microbes), and exfoliation (e.g., dander, hair follicles, allergens, fomites, microbes (e.g., bacteria, fungi and viruses)), for example. The scavenging substance sometimes is a catalyst or is utilized in combination with a catalyst that breaks down an emission from an animal into innocuous substances (e.g., biocatalyst). A scavenging substance sometimes is included in a filter or is located adjacent to a filter, and sometimes is located in another portion of a cage (e.g., on a floor and/or below a sub-floor). Any scavenging substance suitable for use with animals can be used, such as charcoal or other form of carbon.

Lid embodiments sometimes include a delivery component for delivering a consumable element to a housed animal, such as air, water or food. The delivery component sometimes is integral with the lid, sometimes the lid is in contact with a separate delivery component (e.g., a surface of the lid is in contact with a flange member of a food trough), sometimes the lid comprises a holder or receptacle for the delivery component, and sometimes the lid includes an aperture adapted to receive the delivery component. In some embodiments the lid includes one or more connectors adapted to receive an air supply or air exhaust component or water supply component (e.g., a nozzle or nozzle receptacle). A connector can be of any geometry to receive a corresponding connector from an air supply, air exhaust or water supply component. The cage lid connector often mates with the air supply, air exhaust or water supply connector by a sealing attachment, and often by a reversible connection, and the connectors are of any suitable type. For example, the connection may be defined by cylindrical, square, rectangular or conical side geometry, and flat, rounded, tip or point geometry for the top or bottom, for example. The connecting member in the lid may be a protrusion or a void (e.g., concave or convex, respectively) that receives a corresponding mating void or protrusion, respectively.

In some embodiments the connector structure in the lid may be a void that includes two apertures, a larger aperture and a smaller aperture, where the larger aperture is spaced above the smaller aperture. In such embodiments, the mating nozzle connector may be seated, often reversibly, in the void, thereby forming a substantially air-tight seal. In some embodiments the connector structure in the lid comprises a protrusion having an aperture, where the aperture is at the apex of the protrusion. In such embodiments, a void in the mating nozzle connector may be configured to fit over the protrusion in the lid, often reversibly, and forms a substantially air-tight seal. Connection geometry in the latter described embodiments can provide advantages of (a) expanding air exiting an air supply connector along inner walls of the lid connector and other lid and cage surfaces, which expansion cools air in the cage and compensates for thermal load of a contained animal, and (b) substantially reducing or preventing the possibility of damage caused by contained animals (e.g., gnawing, clawing).

Some embodiments of a containment cage have a conical receptacle in the lid, and the connection member may be conical concave in certain embodiments. The nozzle connector of the air supply component may be seated in the lid by hand or by any other method, and connection may be a gravity fit, pressure fit, screw fit, spring bias engagement or another suitable fit. In some embodiments, the conical connector is held in a carriage that guides the connector into the lid. Such carriages sometimes are connected to a rack unit, often to a shelf thereon, embodiments of which are described hereafter. The conical void sometimes may be located in an embossed region of the lid, where the top surface of the embossed region sometimes is substantially elliptical. Where the lid comprises a flange, the height of the embossed region sometimes is equal to or substantially equal to the highest point of the flange.

A connector, such as an air supply and/or air exhaust or water supply connector, sometimes is in contact with a channel. The channel is formed within the lid in some embodiments, and may be formed by raised corresponding raised portions on each side of the lid. The channel in some embodiments may be formed by the mating of (a) a bossed portion of the lid and (b) a corresponding bossed portion in a filter barrier member. The channel often includes one or more apertures on the side opposite the connector, such that air introduced through the connector may enter the cage. In embodiments where the channel is formed in part by a filter shield, the filter shield may include one or more apertures. In some embodiments, two or more apertures are distributed across the length of the channel, which can provide an advantage of distributing or exhausting airflow across the width of the cage, or a portion thereof. The channel may be of any suitable shape for permitting airflow: the channel cross section may be circular, ovular, semi-circular, semi-ovular, rectangular, square, rhomboid or trapezoidal, for example, and the length of the channel may comprise or consist of a linear, circular, triangular, rectangular, ellipsoid, arc, sinusoidal or zig-zag geometry, for example. The length of the channel sometimes is not entirely linear and sometimes it is non-linear. The latter embodiments provide an advantage of reducing adherence of a filter to the lid or a filter barrier as a filter surface cannot depress as readily across a non-linear depression as a linear depression.

Some cage embodiments provided herein allow for transverse cage airflow designed to minimize air recirculation and bypass, thereby providing efficient use of airflow for air exchange and temperature regulation. In some embodiments, provided is an animal containment cage including a lid and a base, where the lid may include an air inlet and an air exit, a baffle between the air inlet and air exit that extends downwards into the interior of the cage, and air flows downward from the inlet, through the cage interior and out the exhaust exit. In certain embodiments, air flows in a substantially U-shaped pattern, and sometimes the cage includes nesting material for an animal and air flows in proximity to or through the nesting material. The air inlet sometimes is at substantially one end of the lid and the air exhaust exit is at substantially the end of the lid. The air inlet sometimes includes an air supply connector, and the air exhaust exit sometimes includes an array of apertures and/or one or more air exhaust connectors. The baffle sometimes extends from one wall of the cage to the opposite wall, and sometimes is one or more surfaces of a feeding tray. The baffle often may be in effective sealing connection with two walls of a cage (e.g., a feeding trough resting on two cradles, one in each of two opposing sidewalls) to prevent or substantially reduce airflow around baffle sides and permit airflow under the baffle.

In some embodiments, a lid or base of a containment cage may be in connection with an airflow baffle. Airflow baffle embodiments often extend downwards from an inner surface of lid embodiments into a portion of the cage interior. A baffle often may be located between an air inlet aperture and an air exit aperture, thereby directing airflow around the baffle. Sides of baffle embodiments often are in close contact or substantially contacted with sidewalls of a cage base so that airflow is directed towards the bottom of the cage base and does not bypass the baffle along cage sidewalls. In some embodiments, a feed tray is configured such that a wall of the tray acts as a baffle. Directing airflow towards the bottom of the cage and then up through the top of the lid may be desirable for purging gaseous waste from bedding material located at the cage bottom and for reducing airflow required for maintaining the animals. In some embodiments, baffle embodiments may be formed by a food trough or tray in connection with a lid and a base that projects towards the bottom of the cage base. The food trough in such embodiments often is a member separate from the lid and the base and rests on a cradle (i.e., mount) formed in an indent within the cage base.

Some lid embodiments may include a water supply component. The lid sometimes includes an integral water supply reservoir to which an emitter is connected or integrated. In some embodiments, the lid includes a water supply receptacle or holder into which a water supply that includes an optional emitter is seated, and in certain embodiments, the lid includes an aperture through which a water reservoir is fixed and/or suspended. In some embodiments, the lid is in connection with or comprises a feed supply component, often referred to herein as a "feeder," "food trough," or "food tray." The lid sometimes includes an integral food tray, and sometimes is in connection with a member of a separate food tray module when the lid is mated with a cage base. In some embodiments, the lid includes a food tray holder into which a food tray is seated, and in certain embodiments, the lid includes an aperture through which a food tray is fixed and/or suspended.

A lid member sometimes does not include an air exhaust connector and sometimes does not include an air inlet connector. Accordingly, in some lid member embodiments: the lid member sometimes is rigid, semi-rigid, or flexible, or includes a flexible region; the lid member sometimes includes a flexible material and a semi-rigid material, and sometimes a filter; a filter in a lid often lids a portion of the surface area of a lid member and not the entire surface area of the lid member; the lid member sometimes comprises a continuously solid surface area and a filter, where the solid surface area is rigid, semi-rigid, flexible or a combination thereof; the lid member sometimes includes a continuously solid surface area and a filter, where the continuously solid surface area is imperforate and not a grid.

Examples of cage members or components in addition to a cage base and lid include watering devices and feeding structures separate from a cage base or cage lid or integrated with the foregoing. These additional members are referred to herein as "insert or insertion members." A cage insert member sometimes may be placed in a cage base or cage lid before a lid is secured to the top of a base embodiments. In some embodiments, an insert member may be located near the top of a cage base in proximity to the lid, such as in food trough embodiments described herein. In some embodiments, an insert member defines a top portion of a containment space for one or more animals housed in the cage. An insert member, such as a food tray, sometimes rests on or is positioned by one or more mounts or cradles extending from an inner surface of one or more sidewall members of a cage base.

In some embodiments, an insert is a substantially flat, planar member, where the surface of the insert is parallel to the surface of the cage base bottom member. One or more edges of the insert member often substantially mate, sometimes are substantially flush, sometimes are in close proximity, and sometimes are sealingly contacted with the inner surface of one or more sidewall members. In some embodiments, each edge of the insert substantially mates, is substantially flush, is in close proximity, or is sealingly contacted with the inner surface of each corresponding sidewall member. An edge of an insert member is of any thickness appropriate for the material from which it is constructed for housing an animal, and sometimes is about 0.010 inches to about 0.080 inches. An insert member is constructed of any material suitable for containing an animal using materials and manufacturing process such as those described for manufacturing cage bases, for example.

An example of an insert member is a food tray. A food tray often includes a bottom integrated with four wall members, and optionally includes a lid adapted to sealing attach to the food tray. One or more sidewall members and/or the bottom, can include one or more openings or slots that expose food in the feeding structure to a housed animal. Opposing sidewalls sometimes are parallel, non-parallel, curved, elliptical or rhomboid, where two or more of the sidewall members may taper downwards to a bottom member having a surface area less than the surface area of the top opening or lid member. Edge and corner junctions between the sidewalls and bottom often are curved and have a radius convenient for manufacture and animal feeding. A radius sometimes is selected to minimize abrasions caused by housed animals.

Some food tray embodiments may include a flange member surrounding the top edge of the food tray. In some embodiments, the food tray bottom is curved and not flat, and in certain embodiments the food tray is constructed from a plurality of vertically arranged tubular structures (e.g., wire). Some food tray embodiments may be constructed of any material suitable for feeding animals, examples of which include but are not limited to: a metal alloy, stainless steel, steel, nickel, nickel alloy, zinc, zinc alloy, aluminum, a polymer, polypropylene, high-density polyethylene, low-density polyethylene, polyethylene teraphthalate, polyvinyl chloride, polyethylenefluoroethylene, polystyrene, high-density polystyrene, acrylnitrile butadiene styrene copolymers and the like, and combinations of the foregoing. In some embodiments, a food tray may be constructed from a polymer, such as the same polymer from which the lid is manufactured, in certain embodiments the food tray is a metal alloy and in some embodiments the food tray may be a combination of a metal structure and a polymer frame or housing component.

In certain embodiments, the tray may be constructed from polyethylene teraphthalate or polystyrene (e.g., high-density polystyrene). In some embodiments, the food tray, and sometimes the cage and/or lid, may be constructed from a substantially hard polymer. Such polymers are known and measures of hardness include Rockwell (e.g., Rockwell M or R), Brinell, Shore, Izod (e.g., Izod impact, notched), Charpy (e.g., Charpy impact, notched) and Vickers measures. Substantially hard polymers, as opposed to softer polymers, may reduce the possibility of gnawing damage caused by contained animals without increasing or substantially increasing material thickness.

Another example of an insert member is a water supply, which also may be referred to herein as a "reservoir." Water or another suitable hydrating liquid is emitted to contained animals via the water supply. The water supply or reservoir, and corresponding reservoir holder or aperture for receiving a reservoir in a cage component (e.g., lid), is of any geometry convenient for dispensing water. A reservoir may be a box-shaped structure, sometimes is a substantially cylindrical structure, and sometimes is a substantially cylindrical structure with gently tapered side walls (slightly conical) and a chamfer. A reservoir sometimes may be geometrically configured to reduce the potential of abrasions caused by housed animals (e.g., reduce abrasions caused by animals gnawing on the watering structure), and in some embodiments, a reservoir comprises rounded corners (e.g., a rounded junction between a bottom edge and a sidewall member edge) and/or edges (e.g., rounded junction between two sidewall member edges).

Rounded corner radiuses are described herein. A reservoir sometimes is adapted to mate with a sealingly attachable lid or cap located in a convenient location of the bottle (e.g., the top or bottom), such as a screw-on lid or snap on lid, for example, such that the reservoir can be filled with water and then sealed with the lid. Accordingly, a reservoir often includes male or female threads adapted to receive threads from a screw-on lid or a fitting for a snap-on lid. A portion of the reservoir exposed to the inside of a cage (e.g., the bottom of the reservoir, cap or lid) often includes a small aperture that can retain water by surface tension until contacted by an animal.

A side wall region of the reservoir may be chamfered and sometimes can mate with a corresponding chamfer in a receptacle of the lid. Such a chamfer can function as a key that ensures alignment of the reservoir in the lid. A step in a radius of the aperture also may generate an interference fit with the reservoir receptacle, ensuring a tight seal between the reservoir and the lid and thereby reducing and substantially preventing air leakage. A reservoir may be constructed of any material suitable for containing a fluid for hydrating animals (e.g., water) including but not limited to: polypropylene, high-density polyethylene, low-density polyethylene, polyethylene teraphthalate, polyvinyl chloride, polyethylenefluoroethylene, acrylnitrile butadiene styrene copolymers, cellulose, cellulose lined with a polymer or metallic foil, and the like.

For embodiments in which a lid comprises a water reservoir holder, the reservoir holder sometimes is substantially cylindrical with slightly tapered sidewalls and a chamber located in the side and bottom. Such a geometry of the holder can key a similarly shaped reservoir, where the chamfers of the holder and the reservoir mate. Such holders often include an aperture, often in the chamfer region, adapted to receive an emitter from the reservoir, such that the emitter is accessible to a housed animal. Such holders often are adapted to receive a reservoir that includes a step in the radius such that the top portion of the reservoir has a larger diameter than the lower portion, which provides an interference fit with the inner wall of the holder and a substantially air tight fit.

In some embodiments, an emitter contains a valve sometimes located in the emitter and sometimes located at the junction of the emitter and the reservoir. In some embodiments, the emitter contains no valve. A quick release coupling sometimes connects the emitter to the reservoir. In certain embodiments, the emitter is conical with the larger cross sectional area connected to the reservoir and a small aperture on the opposite end accessible to a housed animal. In such embodiments, the aperture is sized to retain water in the reservoir by surface tension and to emit water when contacted by a housed animal. In certain embodiments, provided is a water bottle for use in conjunction with a lid, which comprises a cap having an aperture that retains water via the inherent surface tension of water within the cap face, the latter of which is defined by a flat surface. In the latter embodiments, the cape face is not conical and does not include a projection.

Fluid supply embodiments may be configured to reduce the likelihood that an animal resident can damage the supply structure (e.g., gnawing damage). For example, provided herein are rodent containment cage bottles comprising three walls, a top, a bottom an aperture and a barrier in effective connection with the aperture, where: the bottle may be constructed from a polymer; two of the walls are about perpendicular (e.g., 85 degrees to 95 degrees or 90 degrees) and the third wall is curved; and the bottle may retain fluid at the aperture when inverted. The top, bottom and walls of the bottle generally may form a substantially semi-spherical structure, whereby the curved wall has a radius of about 5 inches to about 9 inches (e.g., about 7 inches). Also, wall junctions and corners often are rounded, and the rounded junctions and corners sometimes are defined by a radius of about 0.25 inches or greater. When such water bottles are placed in receptacles oriented near or substantially in contact with one or more walls of a cage base, such design features minimize the likelihood an animal resident can access and damage the bottle or its receptacle.

In certain embodiments, the aperture is located in a cap in connection with the bottle (e.g., a screw cap). The bottle may contain a fluid such as water, and the barrier often may be a removable barrier such as an adhesive tab over the aperture. In some embodiments, the barrier is inside the cap. The barrier can prevent spillage of a fluid contained in the bottle during shipping, and when the barrier is removed or modified to expose the aperture to fluid contents in the bottle, the bottle can maintain pressure equilibrium of a fluid when inverted. The bottles may be constructed from a polymer described herein (e.g., polyethylene teraphthalate). In certain embodiments, a bottle may have a capacity of about 13 ounces and weigh (when empty) about 10 grams to about 25 grams (e.g., about 17 grams), and in some embodiments, a bottle may have a capacity of about 26 ounces and weigh (when empty) about 20 grams to about 50 grams (e.g., about 34 grams). The bottles sometimes are single-use bottles (e.g., the walls often are about 0.01 inches to about 0.08 inches thick), and in certain embodiments, the bottles are multi-use bottles (e.g., the walls often are thicker than 0.08 inches).

Other insert members may be in association with a cage assembly, such as a shelter structure, bedding material, and/or a sub-floor, for example. A shelter structure may be of any shape or geometry that allows an animal to enter the structure and become covered or partially covered by the structure. Any convenient structure for housing animals can be used, and in some embodiments, a shelter is a perforated pipe structure. An example of a combined feeding and shelter structure is described in U.S. Pat. No. 6,571,738 which is incorporated by reference herein in its entirety. A bedding material often is placed in a cage. Any bedding material suitable for housing animals can be used, such as wood chips or newspaper, for example. In some embodiments, a removable sub-floor sometimes is positioned in association with a cage base. Sub-floor embodiments may constructed from any material and is of a geometry that allows foodstuffs, liquid emissions and/or solid emissions from a housed animal to pass through the sub-floor to the cage base bottom member, and in some embodiments, a sub-floor member or a portion thereof is reticulated or perforated (e.g., http address www.ssponline.com/bed.html). A scavenging substance described previously may be placed under the sub-floor in certain embodiments.

In some embodiments, an insert member includes two or more connected planar members, where each planar member has a surface parallel to a surface of another planar member and the bottom surface of one planar member is elevated with respect to the top surface of another planar member. In the latter embodiments, each planar member is connected by a riser member, where a surface of the riser member sometimes is perpendicular to surfaces of the connected planar members and sometimes connects the planar members at a non-perpendicular angle (e.g., about 10 degrees to about 95 degrees). The planar members and one or more riser members often are contiguous, often with seamless junctions. An insert member often is manufactured by a process that renders a unit having no seams or disconnections between the planar and riser members.

Insert member embodiments sometimes include an aperture or a combination of an aperture and a recessed flange adapted to receive a component useful for meeting requirements of a housed animal, such as a feeding structure, watering structure and/or shelter structure, for example. An insert member sometimes comprises one or a plurality of sidewall members (e.g., two, three or four sidewall members) extending downwards into the interior of a cage base member also adapted to support a component useful for meeting requirements of a housed animal. The outer surface of a sidewall member often is perpendicular to the bottom surface of an insert planar member from which it extends and often are contiguous with the bottom surface of an insert member. In some embodiments, a bottom edge of a sidewall member is not parallel to the bottom surface of an insert planar member, and sometimes a side edge of a sidewall member is not perpendicular to the bottom surface of an insert planar member.

Insert member embodiments may include one or more apertures allowing air to enter and/or exit the cage. In some embodiments, the one or more apertures, sometimes referred to as "vents," diffuse air entering a cage at the top surface of the insert. In certain embodiments, one or more vents are in the front portion of the insert so that air flows from the front of the cage to the back of the cage, sometimes by laminar flow (e.g., downward near the front to upward near the rear). For some embodiments, one or more vents may be disposed or configured such that airflow, such as laminar air flow, flows from the back of the cage to the front of the cage. The apertures may be of any geometry allowing for air flow, such as circular, rectangular, square, rhombus and/or reticulated, for example. A filter may be disposed in communication with one or more of the apertures with a protective grate disposed beneath the filter. An insert member often is not connected to a filter. An insert member may include one or more openings, apertures or recesses for receiving other structures, and sometimes is integrated with one or more other structures. Such structures sometimes may be utilized for feeding, watering and/or sheltering animals housed in the cage. Two or more of such structures sometimes are integral, such as an integrated feeding/shelter structure. Where an insert member includes an opening, aperture or recess for receiving another structure, the other structure often is in removable association with the insert, and in some embodiments, the other structure is sealingly mated with the insert member.

In some embodiments, provided herein are animal containment cages including a wall or walls and a bottom, where the cage is constructed from a polymer, and the thickness of each wall is about 0.01 inches to about 0.08 inches. Examples of suitable polymers are described above. In certain embodiments, the thickness of the bottom is about 0.01 inches to about 0.08 inches. The wall or walls and bottom often are of a substantially uniform thickness. The thickness of the wall or walls or bottom sometimes is about 0.01 inches to about 0.05 inches, at times is about 0.02 inches to about 0.06 inches, and can be about 0.02 inches to about 0.03 inches. In some embodiments, the cage is semi-rigid and can flex. Single-use cage embodiments discussed herein may be flexible or semi-rigid.

In some embodiments, the rear wall of a cage base may include one or more apertures adapted to receive or connect to an air supply component, air exhaust component, and/or central water supply component. In some embodiments a base unit may include a break-away member that can expose an aperture for receiving a component such as a sensing probe, water delivery structure or air delivery structure, for example. A break-away member, sometimes referred to as a "punch out" member, sometimes breaks away entirely and sometimes remains attached to the cage by a portion after being broken. In certain embodiments, a cage base may comprise a filter member and one or more optional exhaust ports.

Cage embodiments discussed herein may be single-use embodiments, and sometimes may be used in combination with a rack, an airflow unit, an airflow controller or a combination thereof. Cage embodiments described herein may include or contain one or more animals. The animal sometimes is transgenic, immunodeficient, inbred, contains one or more xenografts and/or lacks one or more functional genes (knock-out animal). The animal often may be a rodent, such as a rodent selected from the group consisting of mice, rats, hamsters, gerbils, guinea pigs, chinchillas and rabbits, for example. A contained mouse sometimes may be a nude mouse or a severe combined immune deficiency (SCID) mouse.

Rack units may be referred to herein as "cage mounting platforms" or "cage mounting systems." The racks sometimes are modular and can be assembled from reversibly connected rack modules. A rack module may have any configuration that allows for reversible stacking in a vertical or horizontal configuration. A rack module sometimes includes a bottom member, two sidewall members a top member, and sometimes a back member and front member (e.g., a skin), where the sidewall members often are parallel or substantially parallel and the top and bottom members often are parallel or substantially parallel. In some embodiments, rack modules are connected by two connection members, one on each side of the module, where the connection member is a post that inserts into an aperture in a rack module. In some embodiments a rack module comprises four horizontal posts vertically extended from each corner of a rectangular bottom member, and connected to a rectangular top member. Rack module embodiments may be constructed from any material of sufficient resilience to allow for repeated assembly and disassembly of rack units. Examples of materials used to construct a rack unit module include metal alloys (e.g., sheet metal) or polymers and the like and combinations of the foregoing. A rack module often comprises airflow components, often located internally, such as plenums, cage supply tubes, and exhaust ports, which are described hereafter.

A connection member for linking one rack module to another sometimes is integrated with one of the rack unit modules and sometimes is separate from the module and/or other modules in the rack unit. In some embodiments, a connection member is engaged with a corresponding connection member in a first rack module and a second rack module, where the first and second rack modules are connected reversibly. In certain embodiments, a first rack module comprises a first connection member and a second rack module comprises a second connection member complementary to the first connection member, where the first and second connection members may be engaged with one another to form a reversible connection between the first and second rack modules. A connection member in a rack module can be configured in any manner that limits the movement of a cage module with respect to another connected cage module and allows for convenient disconnection and reconnection of the modules. In some embodiments, connection members are engaged and/or disengaged without a tool (i.e., rack modules can be assembled and/or disassembled by hand). In certain embodiments, a connection member includes a groove or flange on one or more surfaces of a rack module adapted to receive, sometimes slideably receive, a corresponding flange or groove on or in another rack module.

In some embodiments, a rack module includes one or more mounts and/or connectors configured to receive one or more detachable shelf members, and in certain embodiments, a rack module comprises one or more shelf members. A rack module sometimes is connected to another component other than another rack module. In some embodiments, a rack module is mounted onto a tram member, sometimes via a connector, where the tram is configured for transportation of a rack module or plurality of rack modules (i.e., a rack unit).

One or more cages may be stored on or in a rack module, and any convenient configuration for storing a cage can be utilized. A cage sometimes is placed on a surface of a rack module and stored for a period of time. A cage often resides on a shelf connected to the rack. A rack module sometimes includes one or more mount members useful for storing one or more cages in or on the rack module. A corresponding mount member sometimes is located on one or more outer surfaces of a cage and is adapted to connect with a mount member located on a rack module. In certain embodiments, a mount member is a groove or flange on one or more surfaces of a rack module and is adapted to receive, sometimes slideably receive, a corresponding flange or groove on or in a cage. There may be sufficient distance between the top of a mounted cage and the lower surface of a rack module located above the cage to permit airflow out of the cage in such embodiments.

A rack module may include one or more carriages suitable for contacting a cage with another component. In some embodiments, a carriage sometimes associates a component with one cage or multiple cages. A carriage can be utilized to contact a cage with any component, such as an air supply connector, an air exhaust connector, a central water supply connector and a detector or sensor, for example. A carriage often is connected to a shelf of a rack system in such embodiments. Any suitable carriage can be utilized, such as a carriage comprising a piston or lever, for example, and can be constructed from any suitable material, such as a metal alloy and/or a polymer, for example. The carriage engages a component with a cage member (e.g., a cage base or cage cover) in any suitable manner, sometimes by a linear, arc, vertical or horizontal motion, or combination thereof. The carriage often includes a holder that retains a component that is engaged with a cage member. The carriage sometimes is operated by hand and sometimes is operated remotely by mechanical operation and/or computer-controlled operation, for example. In some embodiments, a carriage is useful in part for orienting the position of a cage in a rack unit, as the carriage often can only engage the member it holds with a cage when the cage is properly oriented on a rack unit. In some embodiments, a carriage applies mechanical pressure to the cage and thereby holds it in alignment. In certain embodiments, a carriage comprises a mechanism that holds its position away from the cage, which can be disengaged for engaging a component of the carriage with a cage component.

In some embodiments, the carriage comprises a lever connected near to an end or at one end of a rack or shelf unit via a hinge and a holder adapted to receive one or more components reversibly associated with a cage. Such a lever often includes a spring that applies downward pressure to the lever when a component to which it is connected is associated with the cage. In certain embodiments, a rack unit comprises one or more carriages connected to an air supply or air exhaust connector (e.g., one, two or more air connectors or nozzles) and reversibly contact the connector(s) with a cage. In some embodiments, the air supply connector and optional air exhaust connector is conical and the cage cover member includes a conical void adapted to sealingly and reversibly connect with each conical connector. In some embodiments, a carriage includes one or more projections (e.g., pins) that can be slideably positioned through one or more corresponding structures of the cage adapted to receive the projection(s) (e.g., one or more apertures in a flange member), which are useful for orienting a cage in a rack unit.

For some embodiments, one or more carriages may each be disposed in connection with an air supply or air exhaust connector and a nozzle in association with the connector, whereby the nozzle of the carriage automatically engages a corresponding cage nozzle when a cage is positioned onto the rack. The carriage may automatically translate along the surface of the cage when a cage is positioned onto the rack, and the position of the carriage can automatically translates along the surface of the cage until the nozzle of the carriage settles on the corresponding cage nozzle. In some embodiments, the carriage nozzle is concave and the corresponding cage nozzle is convex, and sometimes the carriage nozzle and the cage nozzle are conical.

In some embodiments, the carriage may include a pivot in connection with the rack, an arm in connection with the pivot and a cage engagement surface and a spring, and the cage engagement surface is in connection with the nozzle. The spring sometimes is a torsion spring, and the cage engagement surface often includes one or more angled surfaces. The one or more angled surfaces may be at an angle of about 25 degrees to about 45 degrees from horizontal. The angled surfaces allow the carriage to track along differing elevations of the cage as the cage is inserted into the rack, and thereby allows the carriage to automatically translate along an arc (i.e., rotates around a pivot) along the surface of the cage and automatically engage a cage nozzle receptacle. Springs connecting the carriage to the rack may also allow the carriage to automatically track along differing elevations of the cage. In certain embodiments, the angled surface may be about 35 degrees. In certain embodiments, one or more of the carriages may be in connection with one or more shelves on which one or more animal containment cages can be mounted. The shelf in some embodiments contains a flange perpendicular to the shelf floor that engages an animal containment cage.

Air supply and exhaust conduits sometimes may be located within walls of a rack module, and no exterior plumbing may be required in some embodiments. An air conduit system sometimes includes a conduit of comparatively large volume connected to the blower, sometimes arranged in a vertical orientation in a rack module, which is connected to one or more comparatively smaller volume conduits that supply/exhaust air for a group of cages in a manifold of conduits often arranged horizontally. A vertical air conduit sometimes is referred to as a "tube" herein. Air tubes and conduits may be of any suitable shape and are constructed from any material suitable for providing air to or exhausting air from animals. In some embodiments, the manifold may be constructed from rigid tubing connected to flexible tubing that supplies or exhausts air from each cage. Such flexible tubing sometimes is connected at one end to a clamp or metering nozzle in association with a manifold conduit and at the other end to a nozzle that can be engaged with a cage. An air metering nozzle often is located between air supply conduit and an air supply nozzle that engages the cage. Each end of a flexible tube may be reversibly coupled to a nozzle or a clamp, sometimes by a twist lock or quick release coupling, and sometimes is integrated with the end of these components. A nozzle (i.e., outlet member) may be constructed from any material and is of any shape convenient for delivering air to an animal. In some embodiments, the outlet member is a hollow cylinder structure, having tapered or un-tapered walls, or an acicular or needle structure.

A nozzle may be engaged with a cage in any convenient manner that provides/exhausts air to contained animals. In some embodiments, the nozzle may be a connector that mates with a corresponding structure in the cage assembly, often forming an air-tight, or substantially air tight, reversible seal. The nozzle is of any geometry suitable for delivering/exhausting air to/from an animal cage assembly, and sometimes is conical. In conical connector embodiments, the smaller horizontal surface area sometimes is located below the larger horizontal surface area when the nozzle is oriented for air passing vertically through it, and the conical connector often includes a void, sometimes a cylindrical or conical void, defined by apertures in the top and bottom surface of the connector. In some embodiments, one or two nozzles passes through a cage cover member, sometimes through a portion of the cover thickness or trough the entire cover thickness.

Nozzle embodiments may extend through exterior and interior surfaces of a cover member, sometimes piercing through a cover member having no aperture or other structure for receiving the nozzle, and sometimes extends through an aperture formed by a break-away portion of the cover member. Where a nozzle pierces through a cover member, it can pierce through a flexible region in the cover member, and material in the cover may form an air-tight or semi air-tight seal with the outer surface of the nozzle. Nozzles and other members of an airflow system often are not connected to a sidewall member of a cage (e.g., not connected to a sidewall member of a cage base). Air often enters a cage through a cover member, often via a nozzle from an airflow system, and often exhausts through an exhaust nozzle to an airflow system and/or exhaust aperture(s) juxtaposed with a filter in the cover member. Air often does not exhaust through a cage base.

Conduit system embodiments in a rack sometimes include no adjustable valves. A metering nozzle, often having a fixed aperture, may regulate airflow and air pressure in certain rack embodiments. A conduit system may include one or more valves in certain embodiments. Any valve useful for constricting airflow may be utilized. One or more valves sometimes are located at a junction between a main supply/exhaust conduit, manifold and/or flexible tube, sometimes are located at the end of a flexible tube connected that is connected to a cage, and sometimes are located within the length of a main supply/exhaust or manifold (e.g., at a region not at a terminus of the conduit). In certain embodiments, the interior cross-sectional surface area of a conduit (e.g., the cross-sectional circular surface area of a tube) is smaller, and in some embodiments, is substantially smaller, than the interior cross-sectional surface area of a larger conduit to which it is connected. Such a configuration may be useful for providing substantially equal airflow and air pressure to each cage without control valves in the system to regulate airflow and pressure to each cage. For example, the interior diameter of a connector conduit between a manifold conduit and a flexible conduit linked to a cage (e.g., a clamp system described herein) sometimes is about 0.05 inches and the interior diameter of the manifold conduit sometimes is about 0.25 inches or larger. The limiting aperture often is in a metering nozzle and sometimes is in a clamp assembly that couples cage-connected conduit to a manifold conduit.

In some rack unit embodiments a rack unit module includes a front panel, back panel and two side panels and contains within the panels an air supply manifold and tubing connecting the cage bases to the air supply manifold. Such rack units sometimes include an air exhaust manifold and tubing connecting the cage bases to the air exhaust manifold. The remaining space within the panels sometimes is referred to herein as a "plenum." Air can be scavenged directly from cages through tubing connecting each cage to an exhaust manifold, when present, within the panels. Air also may be scavenged from cages by applying negative air pressure within the plenum (e.g., by connecting a tube from an HVAC system to the plenum) and air leaving a cage via its filter is exhausted into the plenum through adjacent ports in the panel in contact with each cage. The latter method may be utilized in addition to or instead of exhausting air through exhaust manifolds. Where the rack unit includes an air supply and air exhaust manifold, and each manifold may be engaged with each cage via connection tubing and air separate supply and exhaust nozzles, positive air pressure and negative air pressure can be controlled to provide only positive air pressure, only negative air pressure, or a combination thereof. Some cage embodiments may include an air filter medium or nonporous medium juxtaposed with apertures in the cover or another member (e.g., aperture array) in such embodiments.

In some embodiments, a rack unit module may be connected to another rack unit module by a flexible tube connected to an air supply conduit and/or air exhaust conduit and one or more separate inserts that slideably engage a corresponding receptacle(s) in the other rack module. In the latter embodiments, a rack module may include one or more guides for connecting the modules to one another. In such embodiments, air supply and/or air exhaust plumbing may be coupled or decoupled at the same time rack units are engaged to/disengaged from one another.

In some embodiments, provided are animal containment cage racks including a tube, an air supply or exhaust connection at one end of the tube (e.g., air blower connection) and conduits connected to the tube that deliver air from the blower to metering nozzles, where air pressure (e.g., measured at the metering nozzles) is about 0.3 inches of water or greater. Such racks sometimes are modular, and in some embodiments are not modular. Air pressure (e.g., measured at the metering nozzles) sometimes is about 0.4 inches of water or greater, about 0.5 inches of water or greater, about 0.6 inches of water or greater, about 0.7 inches of water or greater, about 0.8 inches of water or greater, about 0.9 inches of water or greater or about 1.0 inches of water or greater. In some embodiments, the air pressure may be about 1 inches of water to about 3 inches of water, and can be about 2 inches of water. The pressure of air supplied at each metering nozzle often may not be regulated by an adjustable valve and often may be regulated by the metering nozzle. The orifice diameter of the metering nozzle often may be about 0.25 inches or less, and sometimes is about 0.06 inches to about 0.08 inches. In certain embodiments, a rack includes an airflow or air pressure sensor. The sensor sometimes may be in connection with one or more of a tube, a conduit and/or a metering nozzle. A rack in some embodiments includes one or more shelves each in proximity to a metering nozzle.

In some embodiments, provided are animal containment cage racks including shelves, a tube, an air supply blower connected at one end of the tube, conduits connected to the tube that deliver air from the blower at each of the shelves and an airflow or air pressure sensor, where a controller adjusts air delivered by the air supply blower based upon a set point and a signal from the sensor. In such embodiments, the sensor sometimes is in connection with a tube, a conduit, an air metering nozzle, a cage or combination of the foregoing. The air supply blower sometimes includes two or more fans oriented in series and a controller may be configured to adjust the speed of one or more of the fans. The rack sometimes includes an air exhaust blower, and the air exhaust blower may include two or more fans oriented in series and the controller configured to adjust the speed of one or more of the fans. The controller sometimes is linked by wire to the blower(s) and sometimes it is remote.

Some embodiments of a process for replacing a cage in an animal containment system, includes: (a) removing a used cage that contains an animal from an animal containment system comprising one or more cages, (b) transferring the animal to an unused cage, or placing an animal not formerly housed in the system in an unused cage, (c) placing the unused cage in the containment system, and (d) repeating steps (a) to (c) within a period of time. In some embodiments, provided are processes for replacing a cage in an animal containment system, which comprise: (a) removing a cage that contains an animal from an animal containment system comprising one or more cages, (b) transferring the animal to a single-use cage, or placing an animal not formerly housed in the system in a single-use cage, (c) placing the single-use cage in the containment system, and (d) repeating steps (a) to (c) within a period of time.

Any of the components discussed herein may be combined with one or more other components described herein and/or with one or more other components utilized in an animal containment facility. For example, an animal containment system sometimes includes one or more of the following: one or more cages (e.g., cage base member, lid member and insert member); one or more rack units each comprising one or more rack modules; one or more airflow assemblies (e.g., an air supply blower and/or an air exhaust blower); and one or more detection, monitoring or sensing devices. In some embodiments, air is provided to cages by a central airflow system in an animal containment facility, and sometimes air is provided by an airflow system described herein (e.g., an airflow assembly joined to the top of a rack).

For some embodiments, in order for laboratory personnel and others to have convenient access to the interior space of some containment cage embodiments, it may be desirable for a lid to be disposed in sliding relation to a base of the cage. Discussed herein are animal containment cage assembly embodiments including a cage base having sides, a bottom and lid contact members extending along the top of each of two opposing sides, wherein the lid contact members are shaped to receive a lid in a slidable connection. Also provided are animal containment cage assembly embodiments comprising a cage base and a lid, wherein the cage base includes sides, a bottom and lid contact members extending along the top of each of two opposing sides of the base, and the lid is in slidable connection with the lid contact members. The lid contact members may be a rim, flange or the like or a part thereof that may be dovetail shaped. The lid may include dovetail receptacles or channels to receive the contact members in certain embodiments.

Embodiments may also feature animal containment systems including a rack and a cage assembly mounted on a shelf of the rack, wherein: the cage assembly includes a cage base and a lid slideably mounted to the cage base, the lid is fixed to the rack and the cage base can slide with respect to the lid and rack. The lid may be removably secured to the rack in certain embodiments. The rack in certain embodiments may include a ventilation system, and the ventilation system may include one or more lid connectors in the form of conical receptacles in certain embodiments. The ventilation system may in some embodiments include carriages with nozzles that are configured to couple to lid connectors and may serve gate or meter the amount of air delivered to or exhausted from the interior volume disposed within each cage.

Some containment cage assembly embodiments may include a hydration device, such as a water bottle or central watering device connector, for example. Containment cage embodiments may also be in connection with a food tray. Some embodiments of a cage base and a cage lid may be constructed from a polymer, which may be about 0.01 inches to about 0.08 inches in thickness. For some embodiments, sliding containment cage systems may be useful for increasing the speed at which a laboratory technician can access or retrieve a contained animal, such as a rodent (e.g., a mouse, rat or the like) for manipulation. Snap top lids used for some containment cage embodiments may provide a high level of contaminate containment and may be useful for bio-safety level (BSL) and similar work. However, a snap top cage design may require that such a cage be fully removed from a rack and placed in a change hood or on a separate table top prior to removal of the lid of the cage. Drawer or sliding type containment cage systems, as discussed herein, may be useful for studies in which convenient access to animals is important. Toxicology studies, for example, may require three or more daily treatments to contained animals and the contained animals are not typically treated with agents that are harmful to humans. Sliding containment cage system embodiments described herein therefore may be especially useful for conducting such studies and other studies that require frequent convenient access to contained animals for manipulation of the contained animals.

Certain features of racks, ventilation systems and cages set forth in U.S. patent application Ser. No. 11/300,664 filed on 13 Dec. 2005, International Patent Application No. PCT/US2005/044977 filed on 13 Dec. 2005, U.S. patent application Ser. No. 11/423,949 filed on Jun. 13, 2006, and International Patent Application No. PCT/US2006/023038, each entitled "Containment Systems And Components For Animal Husbandry," each naming Dee Conger et al. as inventors, respectively, may discuss components applicable to embodiments described herein, and have been incorporated by reference herein in their entirety.

Figure 2:
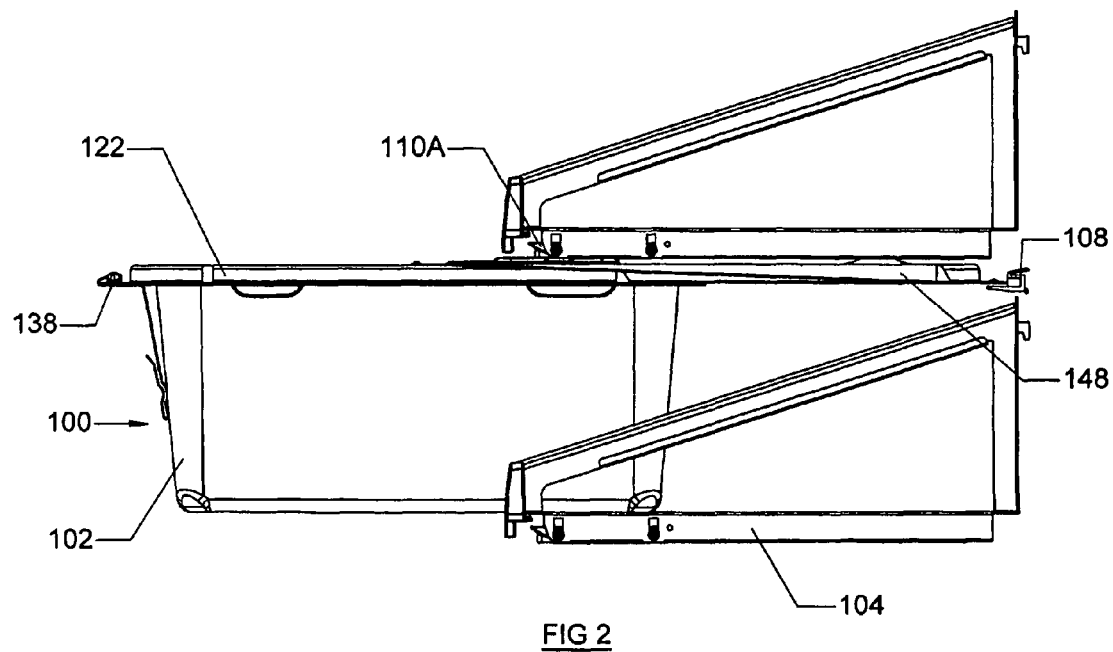
FIG. 2 shows the cage assembly of FIG. 1 in an open state.
Figure 3:
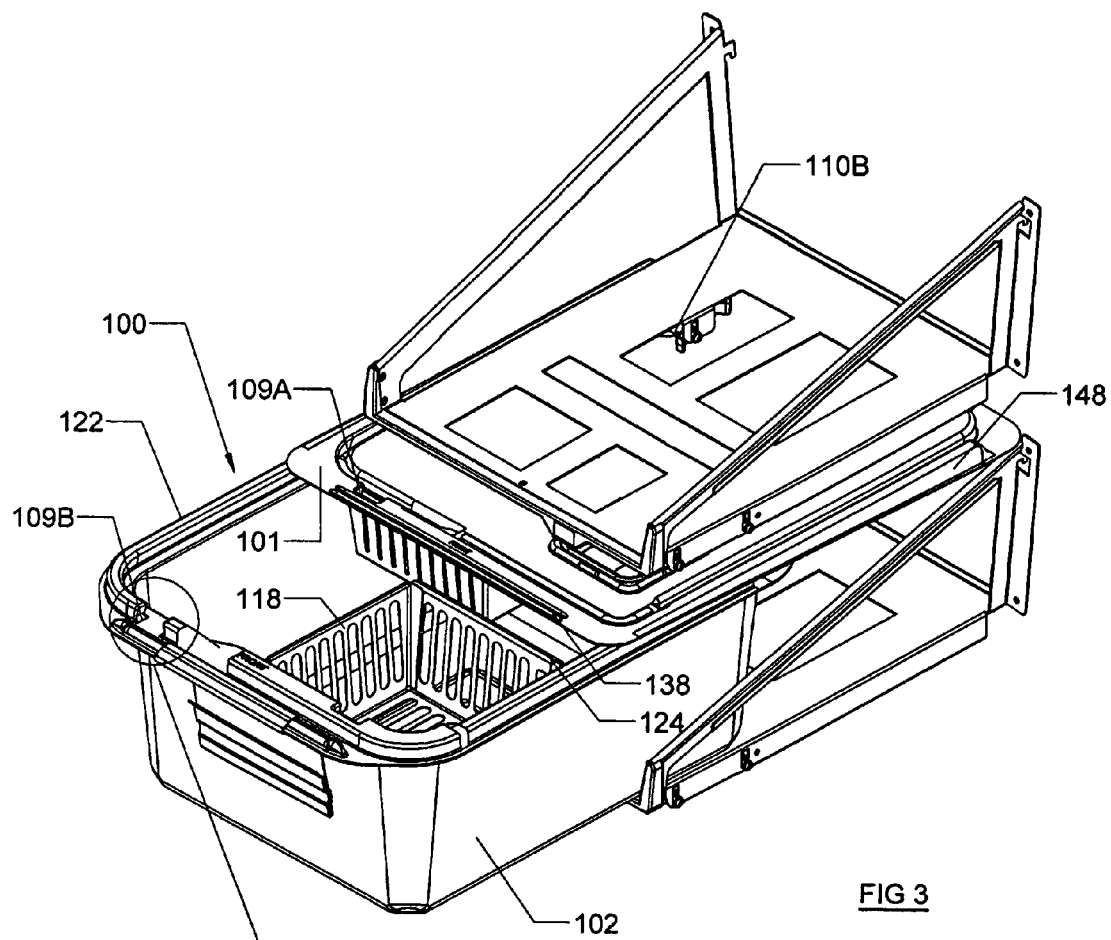
FIG. 3 is a perspective view of the containment cage assembly of FIG. 2 in an open state.

FIGS. 1-3 illustrate an embodiment of a cage assembly disposed is a shelf assembly 104. In FIG. 1, the cage assembly 100 has a lid 101 disposed on and slidingly engaged with a base 102 with the lid 101 in a closed state with the edges of the lid 101 substantially aligned with a perimeter of the base 102. The base 102 includes four sides and a bottom portion having a substantially continuous rectangular structure and lid contact members disposed substantially parallel to each other at an upper rim on opposite sides of the base. The base 102 of the cage assembly 100 is fully inserted into a shelf assembly 104 that may be secured to a rack system, such as the rack system embodiments shown in FIGS. 3A-3C. Lid 101 may have a generally planar configuration with channel members which are disposed parallel to each other at opposite sides of the lid and which may be configured to slidingly engage the lid contact members of the base 102. As such, the lid 101 is slidingly coupled or engaged with the base 102 while maintaining the base 102 vertically coupled or secured to the lid 101.

Figure 3A:
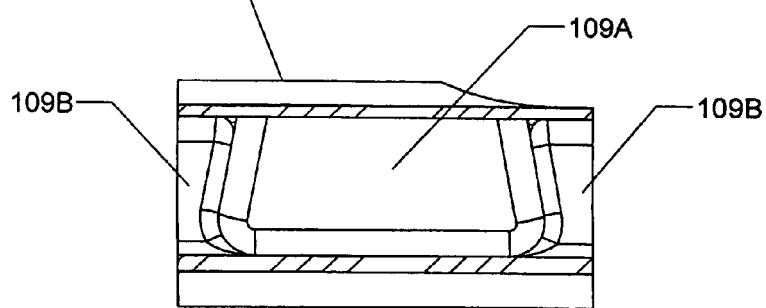
FIG. 3A is an enlarged view of a front edge of the embodiment of FIG. 3.
Figure 3C:
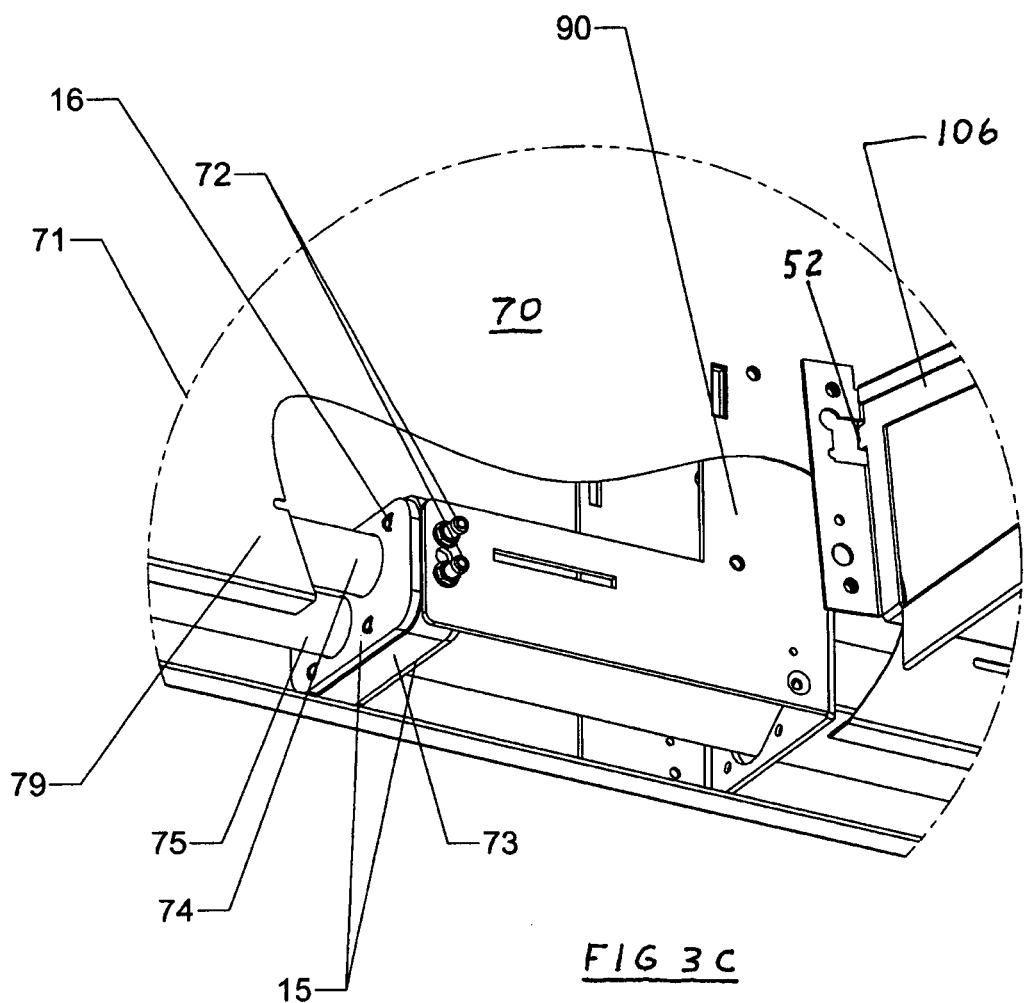
FIG. 3C is an enlarged view of the encircled portion of FIG. 3B.

The embodiment of FIG. 1 illustrates a single cage assembly 100 on a shelf 104 that may be secured to a rack system 53, as shown in FIG. 3C, and, may be configured to accommodate multiple shelves 104 with cage assemblies 100 disposed thereon. For example, up to about 60 to about 100 shelves 104 and cage assembly positions may be used for some rack system embodiments 53 such as with larger rodents like rats, and for other rack system embodiments meant to accommodate cage assemblies for smaller animals, such as mice, rack systems 53 may accommodate up to about 200 cage assemblies, more specifically, up to about 100 cage assemblies.

FIG. 1 also shows a support channel 108 at a rear portion of the shelf 104 that may be configured to mechanically capture a rearward portion of the lid 101 in two or more dimensions so as to stabilize a rearward portion of the lid 101 when the base 102 is pulled forward as shown in FIG. 2. Support channel 108 may also prevent lid 101 from sagging under the influence of gravity and spring pressure when the cage base 102 is in the "open" position or state. The support channel 108 may have an elongate "c" shaped channel configuration that extends from side to side of the shelf assembly. The support channel 108 may be secured to the shelf assembly 104 disposed above the cage assembly which the support channel 108 is configured to engage. The support channel 108 may also be secured by snap fit or any other suitable method to a wall of a rack system, such as wall 70 of rack system module 50 discussed below.

FIG. 2 is a side view of the cage assembly 100 with the base 102 pulled forward and the cage assembly 100 in an opened state. In this configuration, the base 102 has been translated with respect to lid 101 and shelf 104. Lid 101 remains captive with respect to the rack system 106 as a result of being disposed between the shelf 104 below the cage assembly 100 and carriages 110A and 110B disposed above the cage assembly 100 which are part of the shelf assembly 104 above. The carriages 110A and 110B in contact with lid 101 may include or be part of a ventilation system for air delivery or air exhaust. The ventilation system may include nozzles 112A and 112B disposed on carriages 110A and 110B respectively, and shown in more detail in FIGS. 16-20. The nozzles 112A and 112B may be configured to mechanically engage receptacles, such as conical ventilation receptacles 114A and 114B, disposed on the lid 101 and shown in FIG. 4, respectively. In certain embodiments, carriages 110A and 110B may be spring biased in a downward direction and exert a resilient downward pressure from nozzles 112A and 112B on lid 101 through respective conical receptacles 114A and 114B of the lid 101 coupled to the respective nozzles 112A and 112B of the carriages.

FIG. 3 is a perspective view of the cage assembly 100 in an opened state as shown in FIG. 2. The interior volume or space within the cage assembly is shown with insert members or elements that include a food tray and water bottle receptacle. Such an interior volume of the cage assembly 100 may be accessed by sliding the base 102 forward or outward relative to the lid 101 so as to create an opening between the front edge of the lid 101 and the front edge of the base 102 with the base 102 still vertically secured to the lid 101. A users hand or other implement may then be passed through the opening and into the interior volume in order to access the interior volume. For some embodiments, animals may be placed within or removed from the interior volume of the cage assembly 100 in this manner. In some circumstances, it may be desirable to continue to pull the base 102 outward relative to the lid 101 until the channels and lid contact members disengage and the base 102 is completely removed or otherwise disengaged from the lid 101.

A male boss 109A and corresponding female notch 109B, shown in more detail in FIG. 3A, are disposed on a front edge of the lid 101 and front upper edge of the base 102, respectively. The boss 109A and notch 109B have a trapezoidal shape which is configured to allow the boss to slide in and out of the notch in a horizontal direction with a minimum of friction and engage the boss 109A with the notch 109B when the lid 101 is in a closed state with respect to the base 102. When the notch and boss are engaged and the lid closed, the respective trapezoidal shapes are configured to mechanically capture the boss 109A into the notch 109B and prevent vertical displacement of the front edge of the lid 101 relative to the front edge of the base 102. This arrangement may be particularly useful for containment of larger stronger animals that may push upwards on the lid 101 from time to time. One or more mating notch and boss pairs may be used at the front edge of the cage assembly 100. For some embodiments, one mating pair may be used, for other embodiments, two, three or more mating pairs of bosses 109A and notches 109B may be used.

Figure 4:
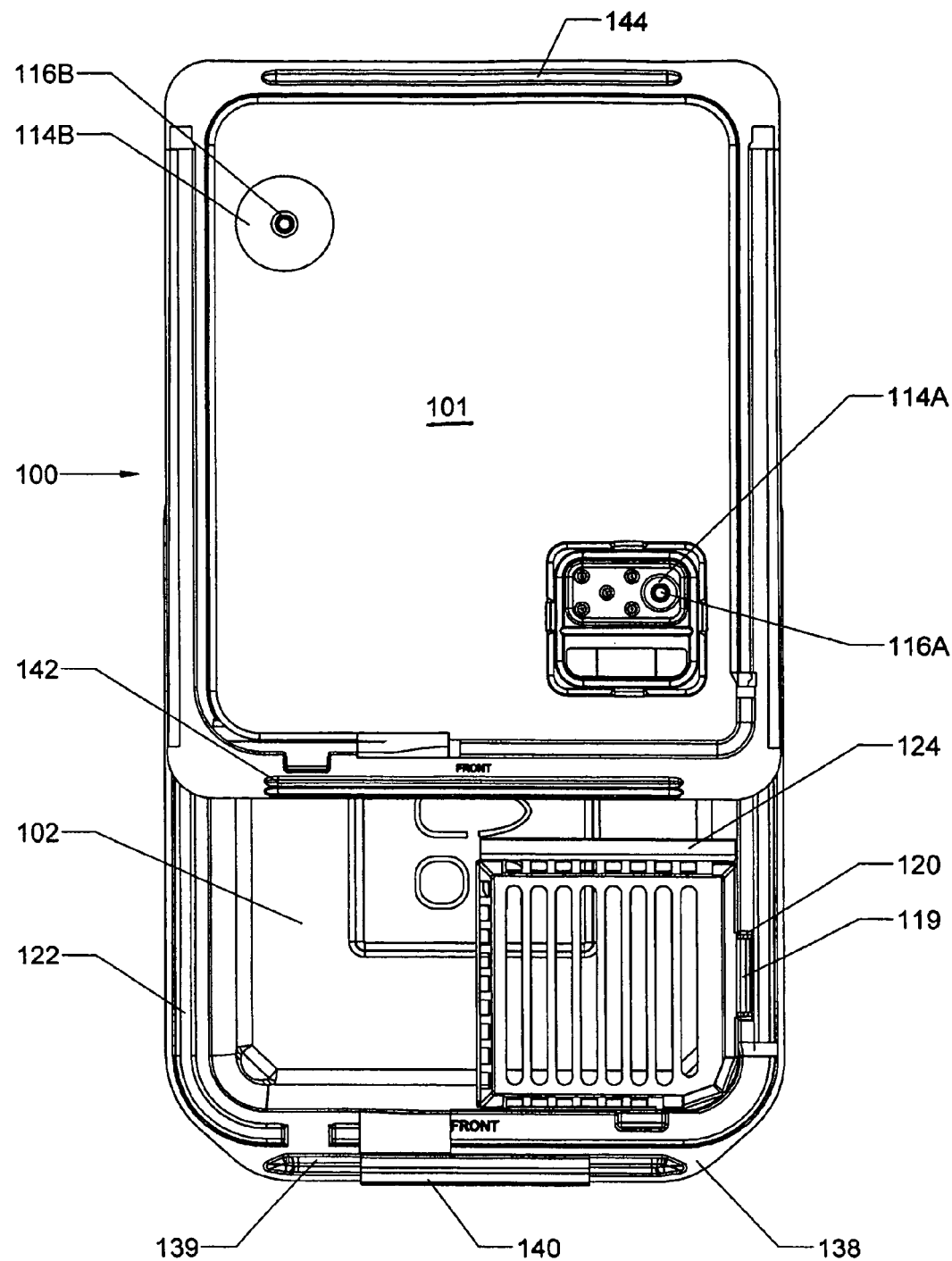
FIG. 4 is a top view of the containment cage assembly of FIG. 2 in an open state without the shelf of the rack system shown.
Figure 8:
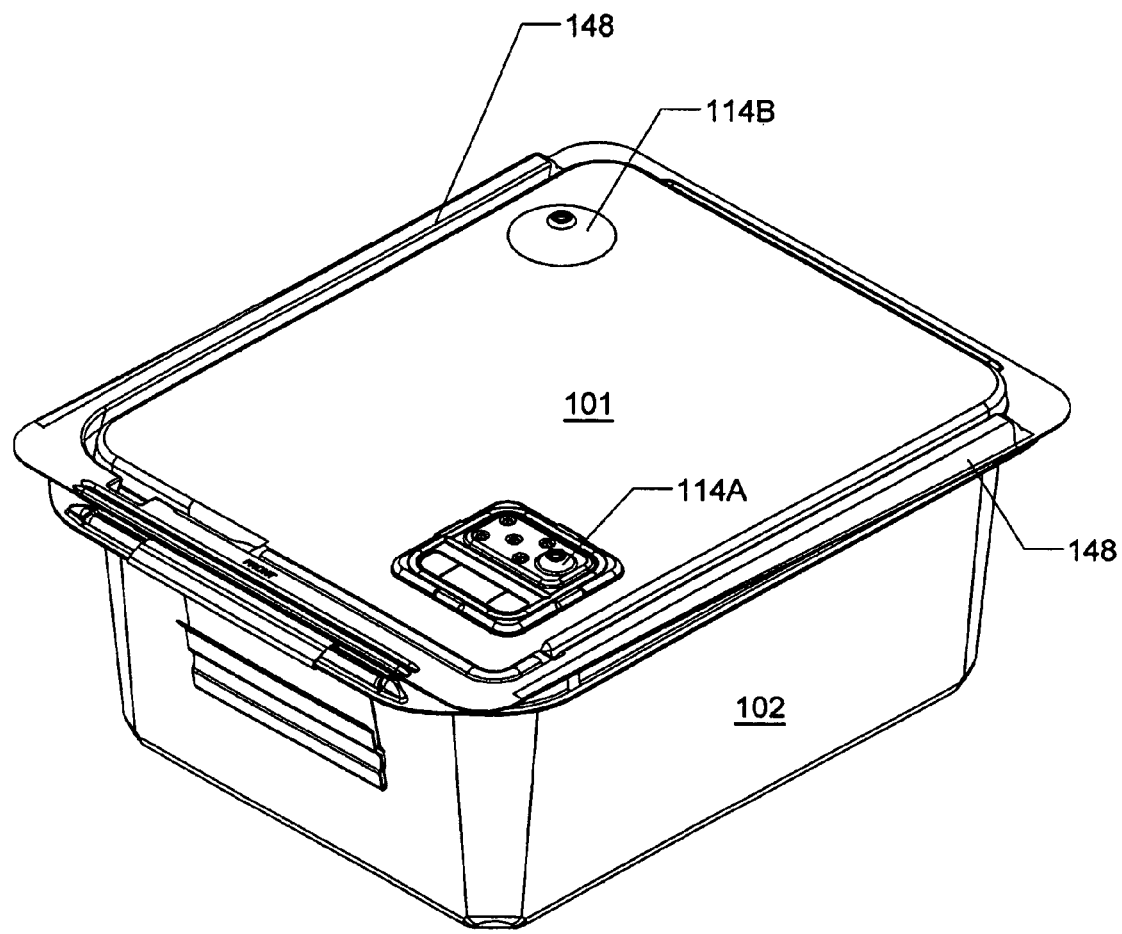
FIG. 8 is a perspective view of the containment cage assembly in a closed state.
Figure 9:
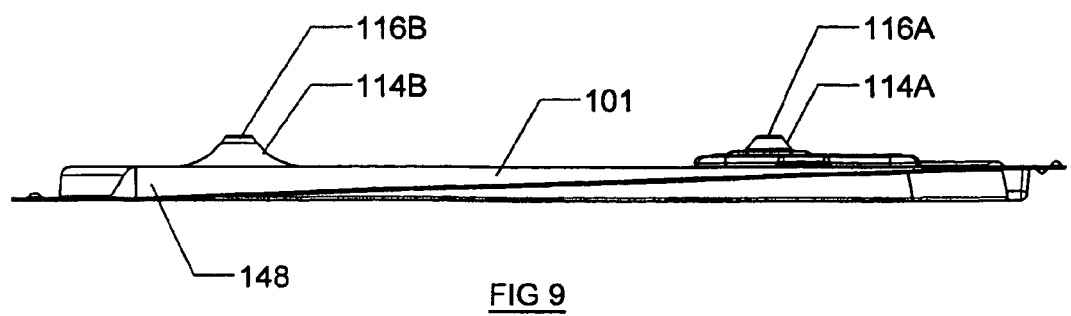
FIG. 9 is an elevation view of a lid of the containment cage embodiment.
Figure 10:
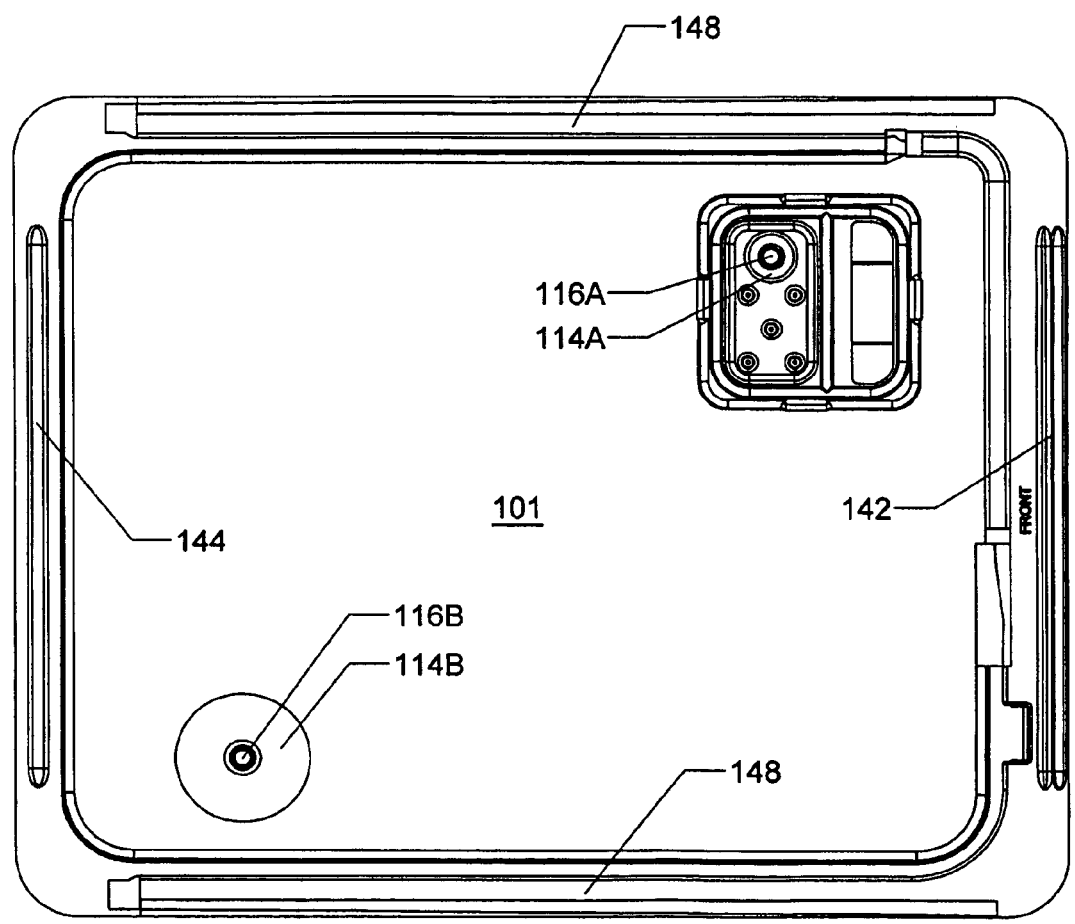
FIG. 10 is a top view of the lid of the containment cage.
Figure 20:
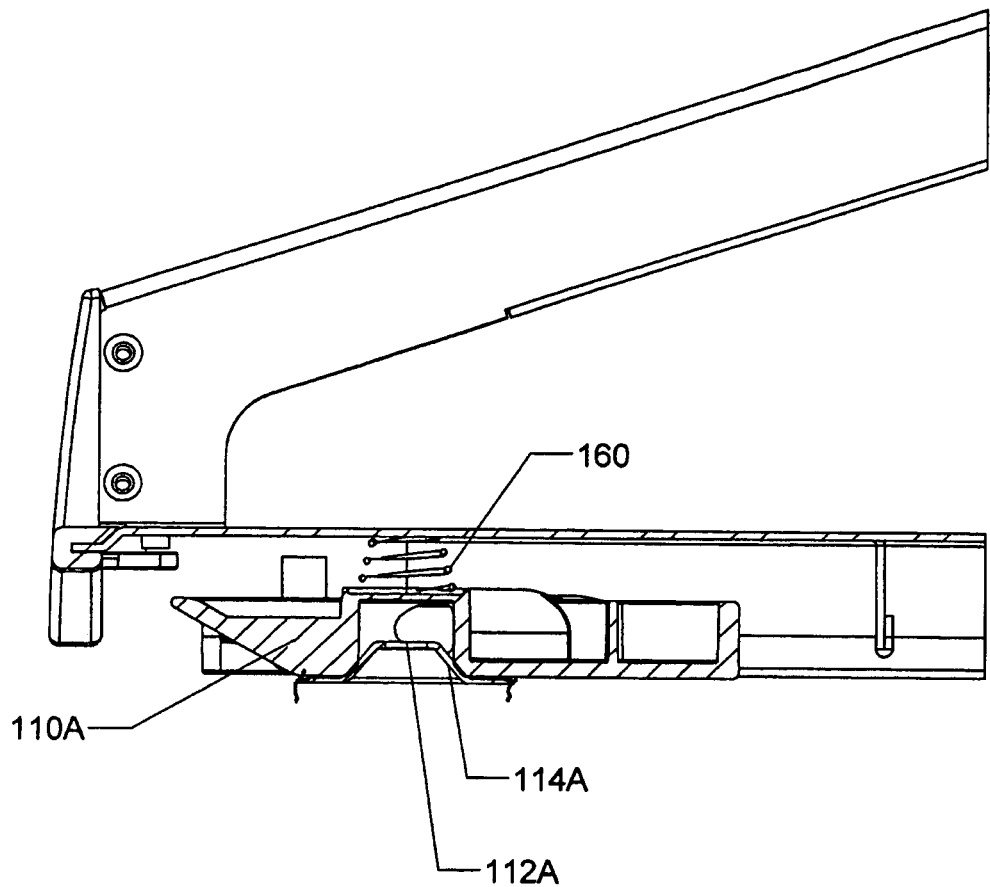
FIG. 20 is a side view in section of a carriage assembly of the rack system.

The conical receptacles 114A and 114B of the lid 101 include respective apertures 116A and 116B, shown in FIG. 4, that may also be in fluid communication with the respective nozzles 112A and 112B when the lid 101 is fully engaged in the rack system 106. The apertures 116A and 116B may be used to provide fluid communication to the interior of the cage assembly when the cage assembly is in a closed state. The apertures may be used to ventilate the interior volume of the cage or deliver or exhaust other gases or materials. The spring biased frictional engagement between the conical receptacles 114A and 114B and the nozzles 112A and 112B may serve to retain the lid in an engaged state with respect to the rack system. The conical receptacles 114A and 114B may be shaped to penetrate into the respective nozzles 112A and 112B and be at least partially mechanically captured therein as shown in FIG. 20. Such an engagement may allow a sealed releasable engagement between respective conical receptacles and nozzles such that pressurized gases may be passed through the apertures 116A and 116B without significant losses to the outside environment, however, the resilient conical engagement may be overcome with sufficient pulling force applied to the lid. When such pulling force is applied, the downward spring bias on the carriages 110A and 110B is overcome and the carriages translate upwardly as the respective conical receptacles 114A and 114B slide out the engaged state. This arrangement also produces a detent configuration when the conical receptacles of the lid are engaged with corresponding nozzles of the carriages.

The lid 101 and base 102, as well as other components of the cage assembly 100 sometimes may be constructed entirely, or in part, from a translucent or transparent material and may have a thickness of about 0.01 inches to about 0.08 inches. Examples of materials utilized for manufacture of a cage assembly components include, but are not limited to, thermoplastics, polyesters, polypropylene (PP), high-density polyethylene, low-density polyethylene, polyethylene terephthalate (PET), polyvinyl chloride (PVC), polyethylene-fluoroethylene (PEFE), polystyrene (PS), high-density polystryrene, acrylnitrile butadiene styrene copolymers and the like.

An embodiment of a rack system module 50 for mounting containment cages is illustrated in FIGS. 3B and 3C. Shelf assembly 104 may be configured to hook onto wall 70 of the module 50 which may include conical air supply and air exhaust connectors attached to one or more carriages that pivot or otherwise translate vertically in an up and down orientation. The wall 70 may be coupled or secured to a frame. The engagement of the hooks at the back end of the shelf assembly 104 with the slots 51 in wall 70 of the module 50 is shown in FIG. 3C at arrow 52. FIG. 3C is a cut-away view in section of some of the internal plumbing of the rack system. Block 81 includes an airflow passage that directs ventilation airflow in a 90 degree bend. Exhaust tube manifold 74 pulls air from each cage. Supply tube manifold 75 delivers air into each cage assembly 100, which rests on a shelf assembly 104. Manifold 74 and manifold 75 may be constructed of any material suitable for delivering air to animals, such as stainless steel tubing, and other metals or plastic could be used. Diverter 73 is constructed from a suitable material (e.g., a plastic such as nylon) for clamping onto manifold 74 or manifold 75 to divert airflow to or from each cage.

Figure 3D:
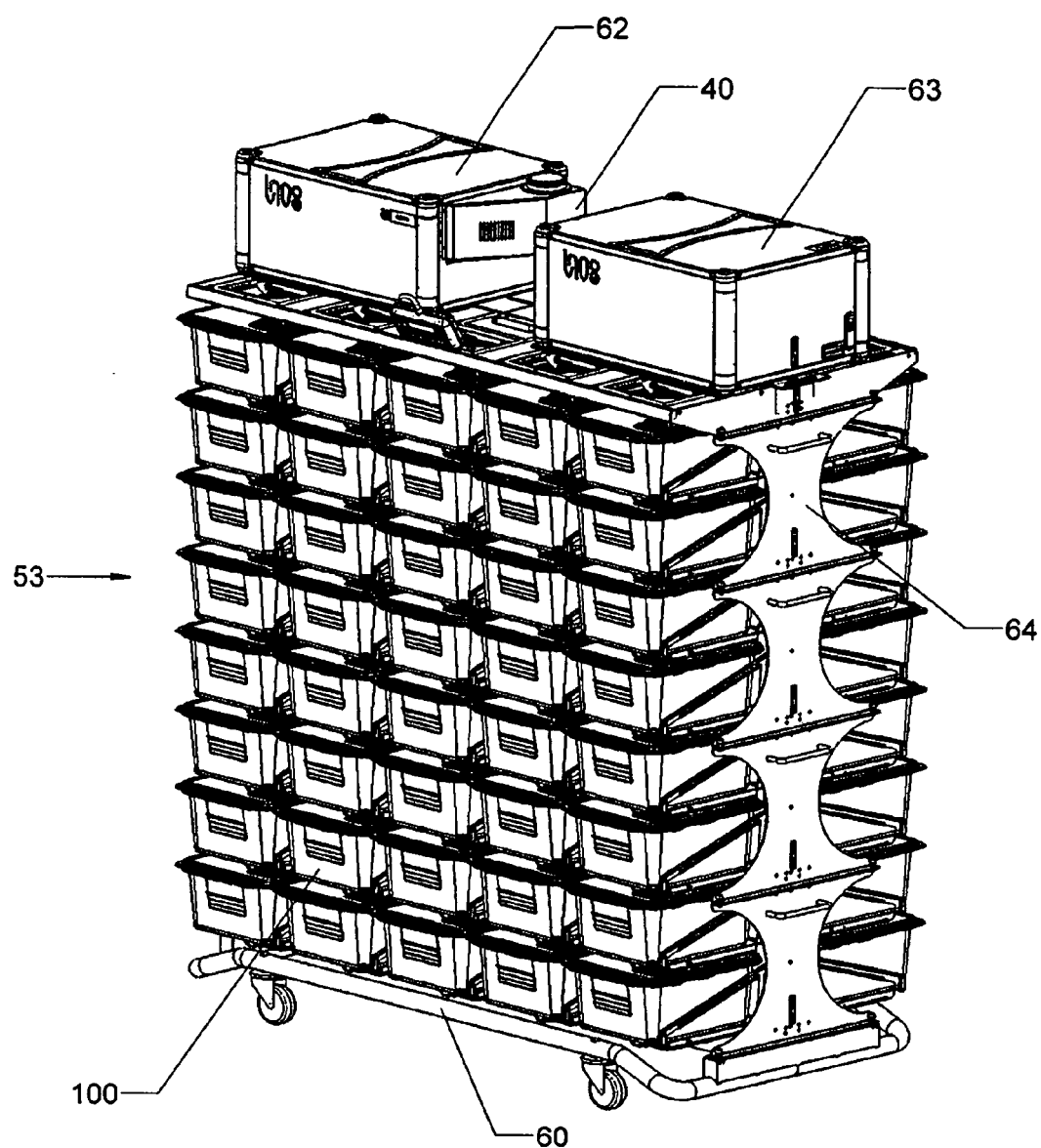
FIG. 3D is a perspective view of an embodiment of a rack system.

Diverter 73 is clamped to manifold 74 and 75 via cover plates 15 and connectors 16 that pass through apertures in cover plates 15. Diverter 73 also serves as a mechanical fastener for the manifold tubes. A skin 79 of wall 70 conceals the internal tubing and may create a plenum for other exhaust air. Internal rib 90 supports the shelves. Air fitting 72 threads into clamp 73. Air passes through this fitting on the way to or from each cage assembly 100 via flexible tubing. FIG. 3D is an isometric view of a rack system assembly embodiment 53 with three rack modules 50 stacked on top of each other. A tram assembly 60 including a plurality of wheels allows for a mobile rack system. The tram assembly may be secured to the frame of the rack system or any other suitable part of the rack system assembly 53. The base member of the tram assembly 60 also restricts airflow of the bottom most module. Each module 64 stores multiple cage assemblies 61. Embodiments of rack systems 53 may be configured to hold about 2 shelf and corresponding cage assemblies to about 100 shelf and corresponding cage assemblies. Ventilation may be provided by a supply blower 62, air is exhausted from cages via an exhaust blower 63, which can be coupled to an optional mixing box 40.

Figure 14:
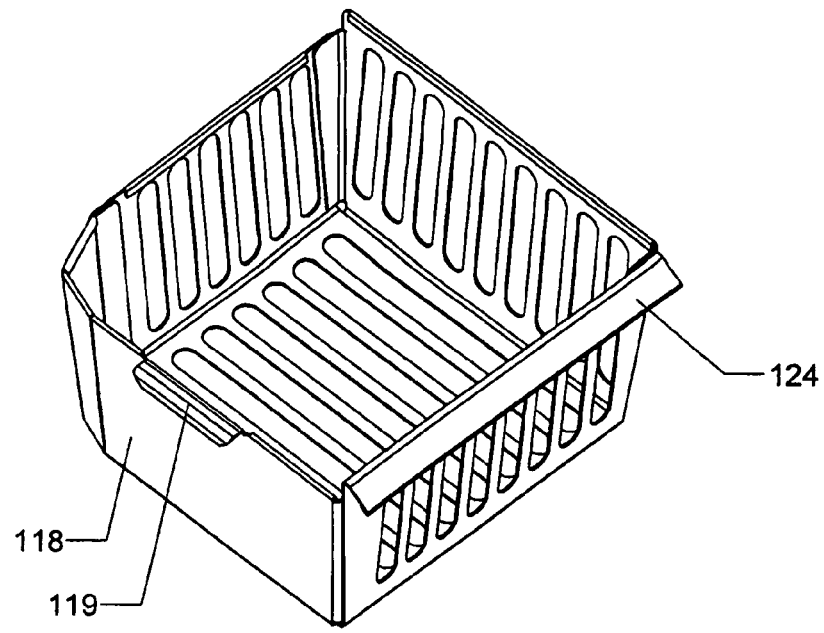
FIG. 14 is a perspective view of a food tray embodiment of the containment cage assembly of FIG. 1.
Figure 15:
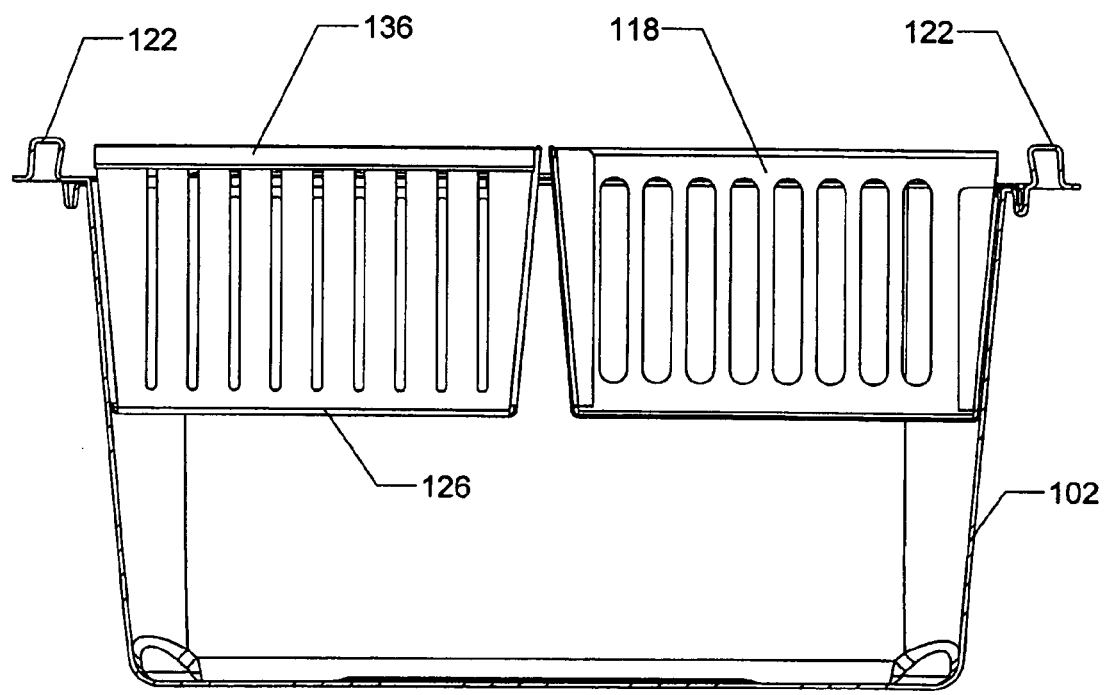
FIG. 15 is a transverse cross sectional view of the containment cage assembly with the section taken through the food tray.
Figure 16:
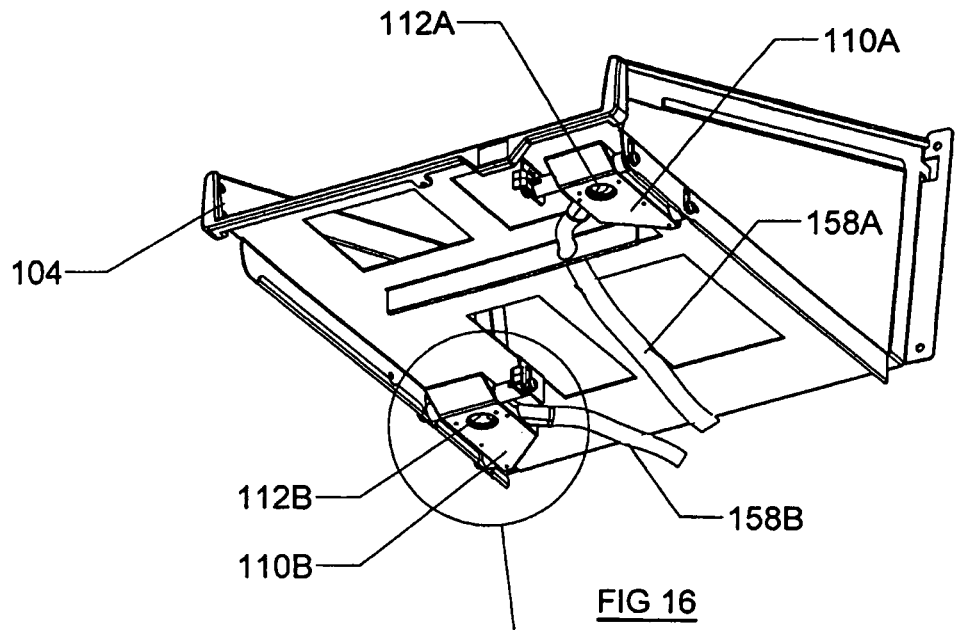
FIG. 16 is a perspective view of a shelf of a rack system from underneath the shelf.

Referring to FIG. 4, food tray 118 configured to hold food pellets for the feeding of contained animals has a hook 119 that is configured to hang or clip onto a slot 120 of the cage base 102. For the embodiment shown, the slot 120 is disposed at or near an upper rim or flange 122 of the base 102 and the food tray 118 is disposed in a front right hand corner of the cage with an upper edge or rim of the food tray 118 near the upper rim 122 of the base 102. Embodiments of food tray 118, shown in more detail in FIG. 14, may be constructed from a high strength material that is highly resistant to chewing or gnawing by rodents. Such high strength materials may include metals such as steel, stainless steel, aluminum or the like. The food tray 118 is substantially rectangular with elongate slots extending in the sides and bottom thereof. The food tray 118 has four sides and a bottom portion that are connected together in a substantially continuous structure with one corner of the food tray 118 having a radius configured to substantially match an inner radius of the front right hand corner of the base 102.

The food tray 118 also has a ramped portion 124 disposed on a rear facing edge of the food tray 118. The ramped portion 124 is configured to guide a leading or front edge of the lid 101 in an upward direction as the base 102 is being closed from an open state. This may be useful as the lid 101, and particularly, an edge of the lid 101 may sag in some portion due to gravity or downward bias forces from the carriages 110A and 110B and interfere with the food tray 118 during the closing process. When the base 102 is in a closed state with respect to the lid 101, the aperture 116A in the lid 101 is disposed above the food tray. This position of the aperture 116A may protect the aperture from gnawing or chewing from contained animals and the slots in the food tray 118 and gaps between the food tray and lower surface of the lid 101 allow air or other gases to flow freely into the interior volume of cage assembly when in a closed state.

Figure 11:
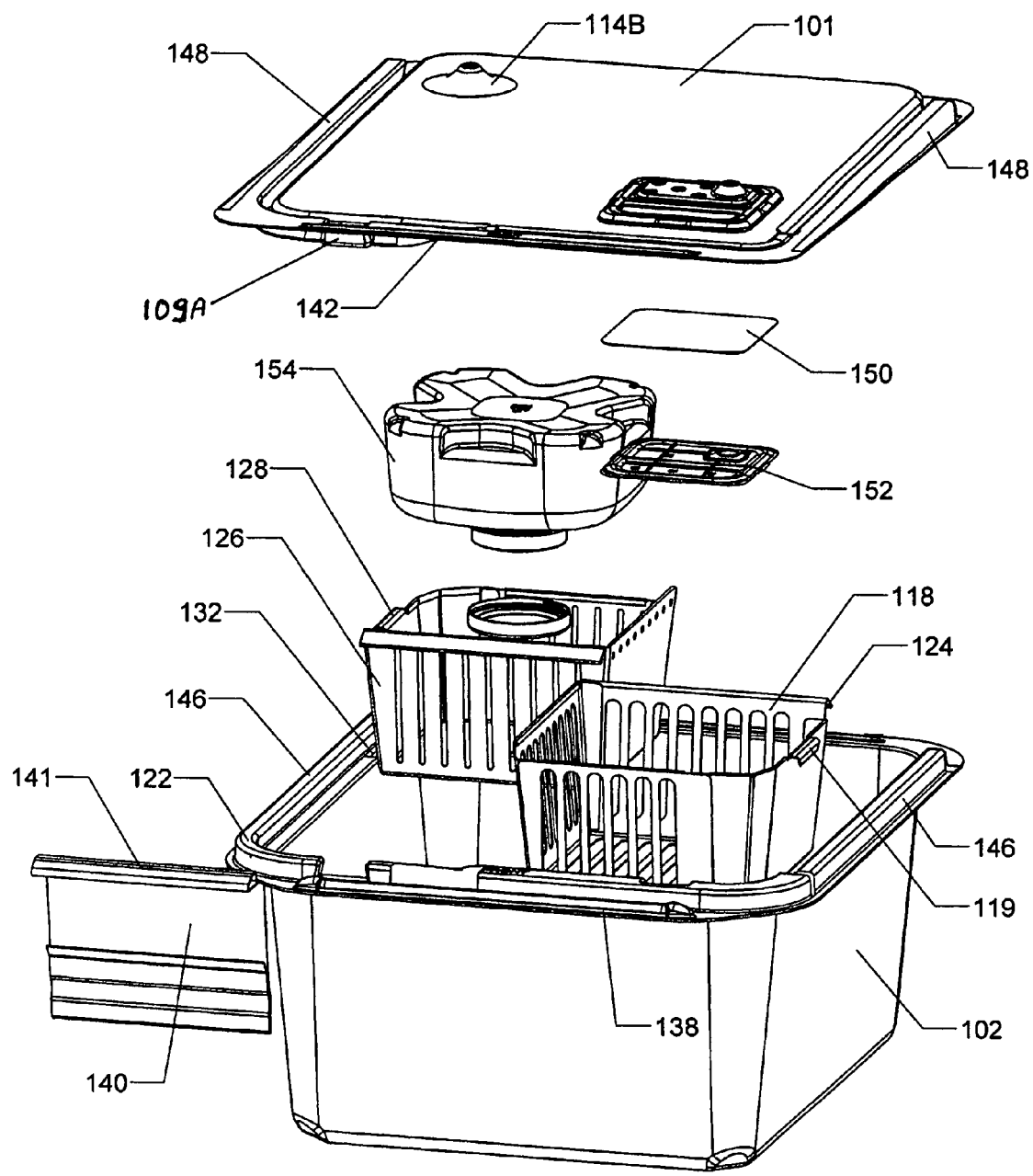
FIG. 11 is an exploded view of the containment cage assembly embodiment of FIG. 1.
Figure 12:
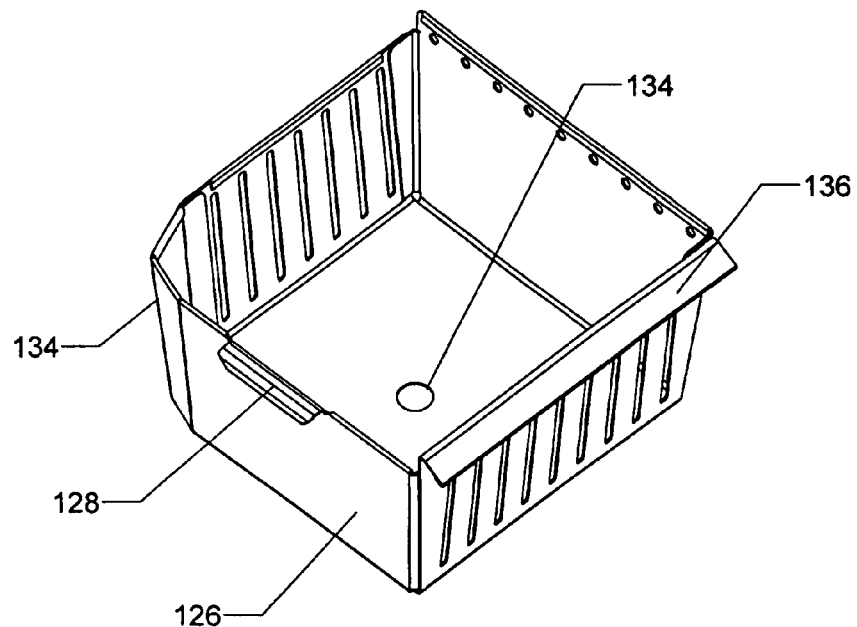
FIG. 12 is a perspective view of a water tray embodiment of the containment cage assembly of FIG. 1.
Figure 13:
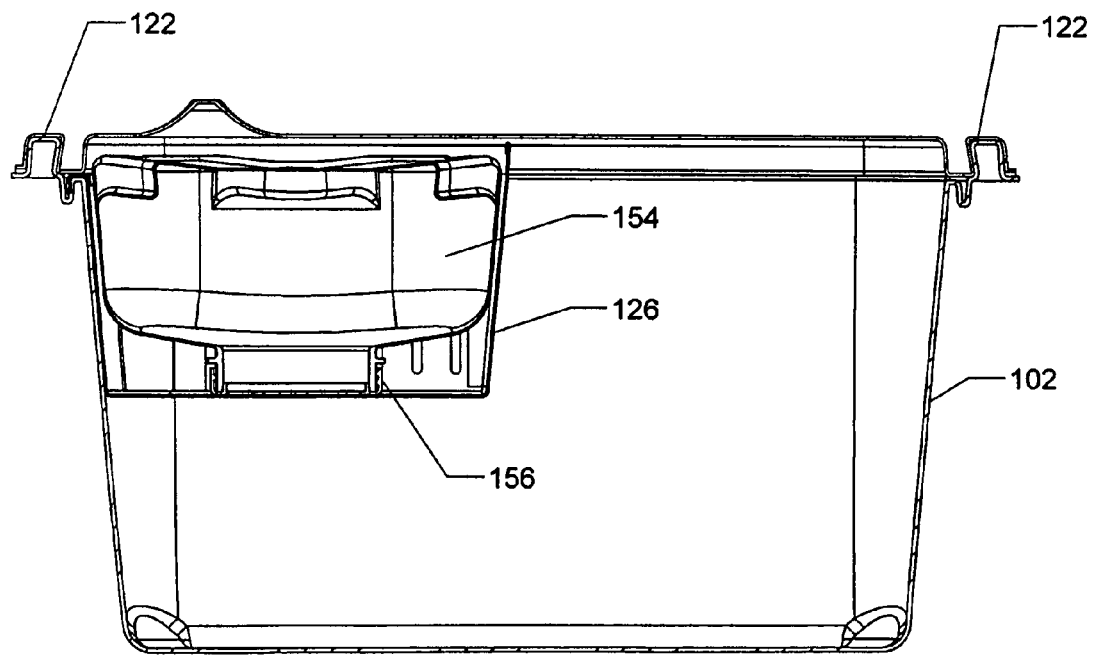
FIG. 13 is a transverse cross sectional view of the containment cage assembly with the section taken through the water bottle assembly and water bottle tray.

Referring to FIGS. 5 and 11, a water bottle tray 126 that is configured to hold and protect a water bottle for the hydration of contained animals has a hook 128 that is configured to hang or clip onto a slot 132 of the cage base 102. For the embodiment shown, the slot 132 is disposed at or near an upper rim or flange 122 of the base 102 and the water bottle tray 126 is disposed in a rear left hand corner an interior volume of the cage base 102 with an upper edge or rim of the water bottle tray 126 near the upper rim 122 of the base 102. Embodiments of water bottle tray 126, shown in more detail in FIG. 12, may be constructed from a high strength material that is highly resistant to chewing or gnawing by rodents. Such high strength materials may include metals such as steel, stainless steel, aluminum or the like. The water bottle tray 126 is substantially rectangular with a water access aperture 134 extending through a bottom portion thereof. The water bottle tray 126 has four sides and a bottom portion that are connected together in a substantially continuous structure with one corner 134 of the water bottle tray 126 having a radius configured to substantially match an inner radius of the rear left hand corner of the base 102.

The water bottle tray 126 has a ramped portion 136 disposed on a front facing edge of the water bottle tray 126. The ramped portion 136 is configured to guide a leading or front edge of the lid 101 in an upward direction as the base 102 is being closed from an open state. When the base 102 is in a closed state with respect to the lid 101, the aperture 116B in the lid 101 is disposed above the water bottle tray 126. This position of the aperture 116B protects the aperture from gnawing or chewing from contained animals and the slots in the water bottle tray 126 and gaps between the water bottle tray 126 and lower surface of the lid 101 allow air or other gases to flow freely into the interior volume of cage assembly when in a closed state. Apertures 116A and 116B may be configured to direct the flow or air down towards and/or into the bedding which may be disposed in the bottom of the base 102 when the cage assembly 100 is in use.

Referring to FIGS. 4-7, an extended tab 138 on the front edge of the base 102 may serve as a handle for a user to grasp when pulling the base 102 open. Ridge 139 on the extended tab 138 may serve to provide additional grip for a user sliding the cage base 102 inwards or outwards. The ridge 139 may also serve to removably secure a labeling card holder 140 that has a top edge 141 bent back on itself and configured to slide laterally onto the extended tab 138 and over the ridge 139.

FIG. 6 shows an enlarged view of a small detent 142 on a front edge of the lid 101 is shaped as an elongated abutment with ramped leading and trailing edges. When the base 102 is closed, detent 142 deflects over rim 122 of the base and then snaps down to retain rim 122 in the closed position. Detent 142 may be configured to provide a snapping sensation when the base 102 is closed completely. Detent 142 may also improve the stiffness of the lid 101 and may reduce the amount of air leakage in this region. FIG. 7 is an enlarged view of the rear edge of the cage assembly 100. Rear detent 144 of the cage base 102 may be similar in shape to lid detent 142 and configured to mate with a matching channel formed in the lid 101. Detent 144 may be configured to produce a snapping sensation to the user when the cage base 102 is fully inserted into and aligned with the lid 101. Detent 144 may also increase the stiffness of the back of the cage assembly 100.

Referring to FIGS. 8-11, lid contact members 146 of the base 102 extend substantially parallel to each other along the top of two front to back opposing sides or upper rim of the base and may be formed from portions of the rim 122 of the base 102. Embodiments of the lid contact members may also extend continuously across the front edge of the base 102. The lid contact members 146 are configured to serve as guides over which channels 148 of the lid 101 may slide while being captured by a dovetail type engagement or the like between an inside surface of the channels 148 and an outside surface of the lid contact members 146. Members 146 and 148 may be interlocking and be dovetail shaped in cross section to facilitate sliding and provide mechanical capture of the members so as not allow the lid 101 to be easily removed from the base 102 (e.g., a sliding dovetail arrangement or the like). This latter feature may be important in situations where the cage assembly 100 is outside the rack system 106 and the contained animals are relatively strong (e.g., large rats) and exert separation pressure to the lid 101 and cage base 102.

The height and engagement of the channels 148 of the lid tapers from a maximum height in the rear of the lid 101 to a height of about zero in the front of the lid 101. The rim portion 122 of a cage base 102 positioned to mate with the corresponding channel portion 148 of the lid 101 by a snap interference fit. Surfaces of the channel portion 148 the lid 101 fit over surfaces of the rim portion 122 of the base 102. For some embodiments, the lid contact members 146 may terminate at a rear edge of the base with an upper rim of the rear edge of the base disposed vertically lower than an upper rim of the contact members in order to accommodate forward displacement of the base 102 relative to the lid 101. The angle between adjacent surfaces of either portion 146 and 148 may be about 80 degrees in the relaxed position, for some embodiments, about 75 degrees to about 85 degrees, and a snap interference fit may be formed elastically by deflecting that angle to about 90 degrees by fitting the lid 101 over the cage base 102, and then allowing the angle to revert back to the about 80 degree or 75 degree to about 85 degree relaxed position when the surfaces of the lid and the cage are fully engaged. For some cage assembly embodiments, the bottom of the base 102 may be substantially parallel to the lid contact members 146 and channels 148 of the lid 101.

FIG. 11 is an exploded view of the cage assembly 100 and illustrates a variety of components of the cage assembly 100.

The water bottle tray 126 and food tray 118 are shown raised vertically from their respective mounted positions within the cage base 102. A filter element 150 and filter cover 152 are shown below the conical receptacle 114A. The filter cover 152 is configured to be removably secured to a mating recess in the lid 101 over the filter element 150 and hold the filter element against an interior surface of the lid 101. A water bottle assembly is shown above the water bottle tray 126. The water bottle assembly includes a water bottle 154 and a mating lid 156 disposed below the water bottle 154. The water bottle lid 156 includes an aperture (not shown) that aligns with the aperture 134 in the bottom of the water bottle tray 126 when the water bottle assembly is properly positioned within the water bottle tray 126. The upper edge of the water bottle tray 126 and upper surface of the water bottle 154 are both disposed below an inside surface of the lid 101 when positioned for use which allows the lid 101 to slide over the water bottle 154 and water bottle tray 126.

Referring to FIGS. 16-20, more detailed views of the underside of a shelf 104 of a rack system 106 is shown. Mounted beneath the shelf 104 are two carriages 110A and 110B. The carriages include respective nozzles 112A and 112B configured to engage respective conical receptacles 114A and 114B of the lid 101. The carriages may be disposed in a functional arrangement with the shelf or rack assembly generally wherein the carriages are disposed above a shelf in a position to be coupled to a conical receptacle of a cage assembly 100 disposed within or on the shelf. The nozzles 112A and 112B are also in fluid communication with respective flexible tubular members 158A and 158B which may have interior lumens or channels which may be in fluid communication with air fittings 72 and may serve to provide a source of pressurized gas or a source of negative pressure for ventilation of the cage assembly 100. The source of negative pressure or positively pressurized gas may include a ventilation system. This may allow air to flow downward into an interior volume of the base 102 and towards or into bedding material disposed in the bottom of the base 102 when the cage assembly 100 is in use. A user may pull the lid 101 and cage base 102 simultaneously from the rack by engaging the lid and cage base units directly, and the lid 101 and cage base 102 will automatically disengage from the spring loaded cone receptacles of the nozzles 110A of the rack.

Each carriage may be biased in a downward direction by a spring member, such as spring member 160, shown in FIG. 20, or the like. In FIG. 20, a cutaway portion of the lid 101 is shown with the conical receptacle 114A mechanically engaged within the nozzle 112A of the carriage 110A. A seal may be formed between an outer surface of the conical receptacle 114A and an inner surface of the nozzle 112A. For the embodiment shown, spring member 160 includes a coil spring having a coil element with a substantially round transverse cross section and a cone-shaped profile, however, any other suitable spring member configuration may be used. A bottom end of the spring member 160 is disposed within a round recess portion of the carriage 110A so as to mechanically capture and confine the lower end of the spring and prevent movement or slippage of the bottom end of the spring in a horizontal direction. The upper end of the spring is in contact with a frame portion of the shelf assembly 104.

Each carriage 110A and 110B may include a body portion which is mounted by a translating support system that allows each carriage to translate horizontally or laterally in directions substantially perpendicular or transverse to a direction of force exerted by the spring member 160. Lateral or transverse translation may include front to back and side to side translation relative to the support frame or shelf assembly generally for the embodiment shown as indicated by arrows 162 in FIG. 19. Such transverse translation allows the carriage 110A and 110B to couple to a respective conical receptacle 114A and 114B of the lid 101 even if the cage assembly 100 is positioned beneath the carriages 110A and 110B such that the nozzles 112A and 112B of the carriages 110A and 110B are not perfectly aligned with respective conical receptacles 114A and 114B. This situation of imperfect alignment may be particularly prevalent in situations involving larger cage assemblies with larger heavier animals where the cage assembly does not easily slide on a shelf 104 of a rack system 53 in order to achieve such alignment.

Figure 17:
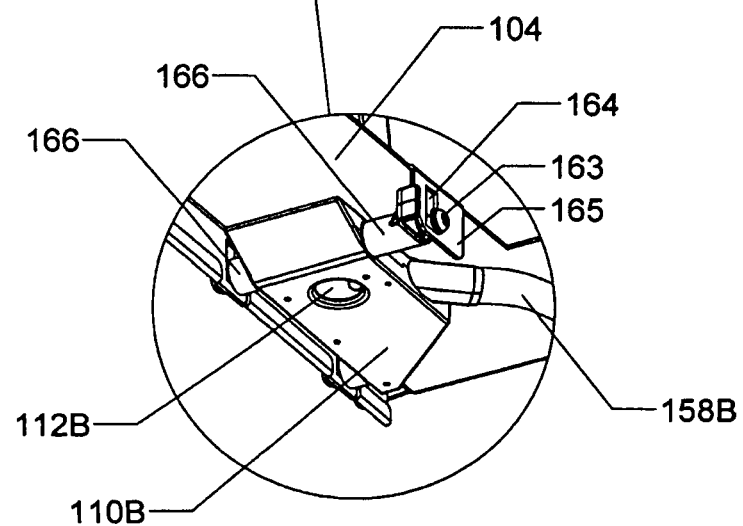
FIG. 17 is an enlarged view of a carriage assembly of the shelf and rack system of FIG. 16.
Figure 18:
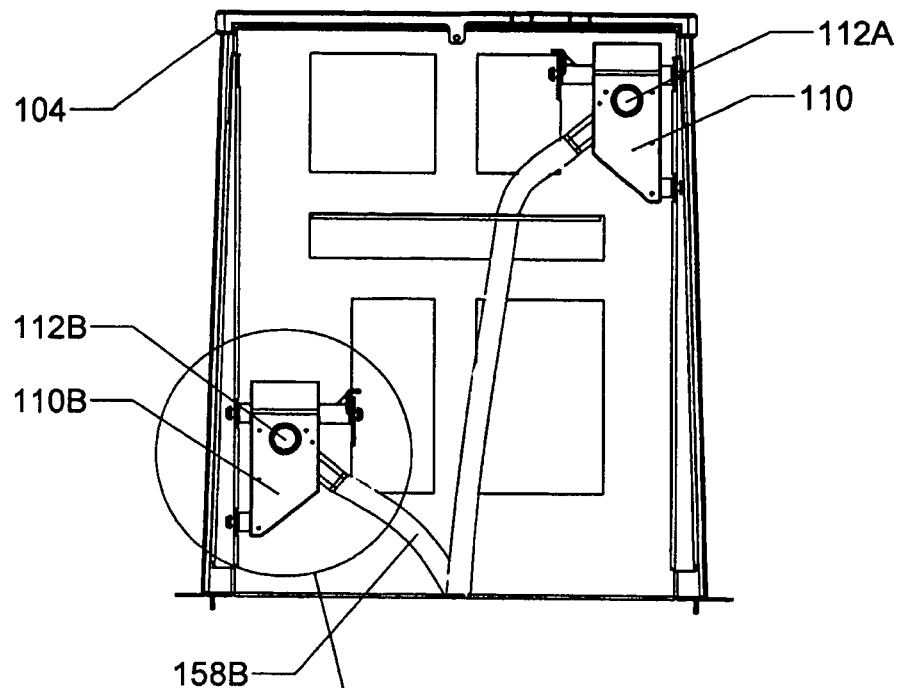
FIG. 18 is a bottom view of the shelf of the rack system.
Figure 19:
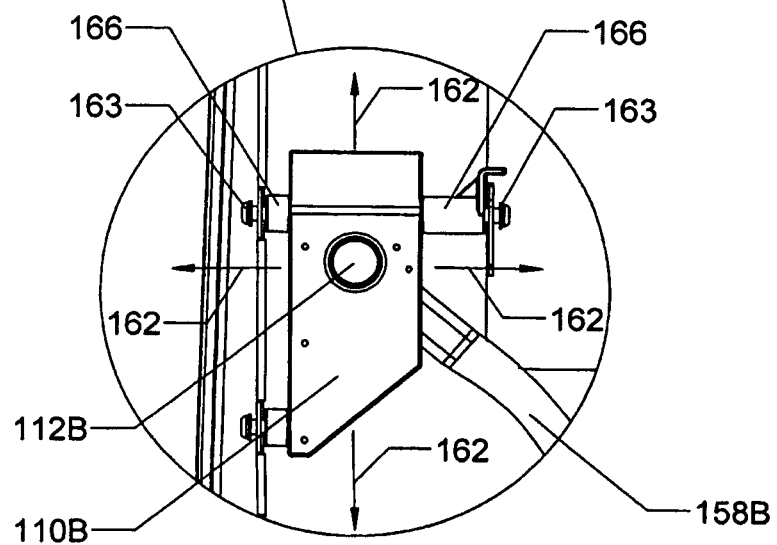
FIG. 19 is an enlarged view of a carriage assembly of the shelf and rack system of FIG. 18.

For some embodiments, the carriages 110A and 110B may be mounted by a plurality of fasteners 163 that include a shaft portion and a flange portion. The shaft portion of each fastener 163 extends rigidly from the carriage body through respective slots 164 in a frame support structure or system 165 as shown in FIG. 17. The flange portions at the end of the shaft portion may be larger than the size of the slots 164 and the shaft portion smaller than an inside dimension of the slots 164 so as to allow the shaft portion and carriage body generally to move about vertically and horizontally within the slot. The length of the shaft portion and length of respective spacer elements 166 disposed over the shaft portion and disposed between the carriage body and frame structure 165 may also be configured to allow transverse movement of the carriage body with respect to the frame structure in a side to side direction. For some embodiments, the carriage assemblies may be configured to translate transversely in either a side to side or front to back direction by about 0.1 inches to about 0.5 inches. In addition, the carriage assemblies may be resiliently biased by spring members (not shown) or any other suitable configuration to remain substantially transversely centered in the absence of an external force applied thereto.

Figure 21:
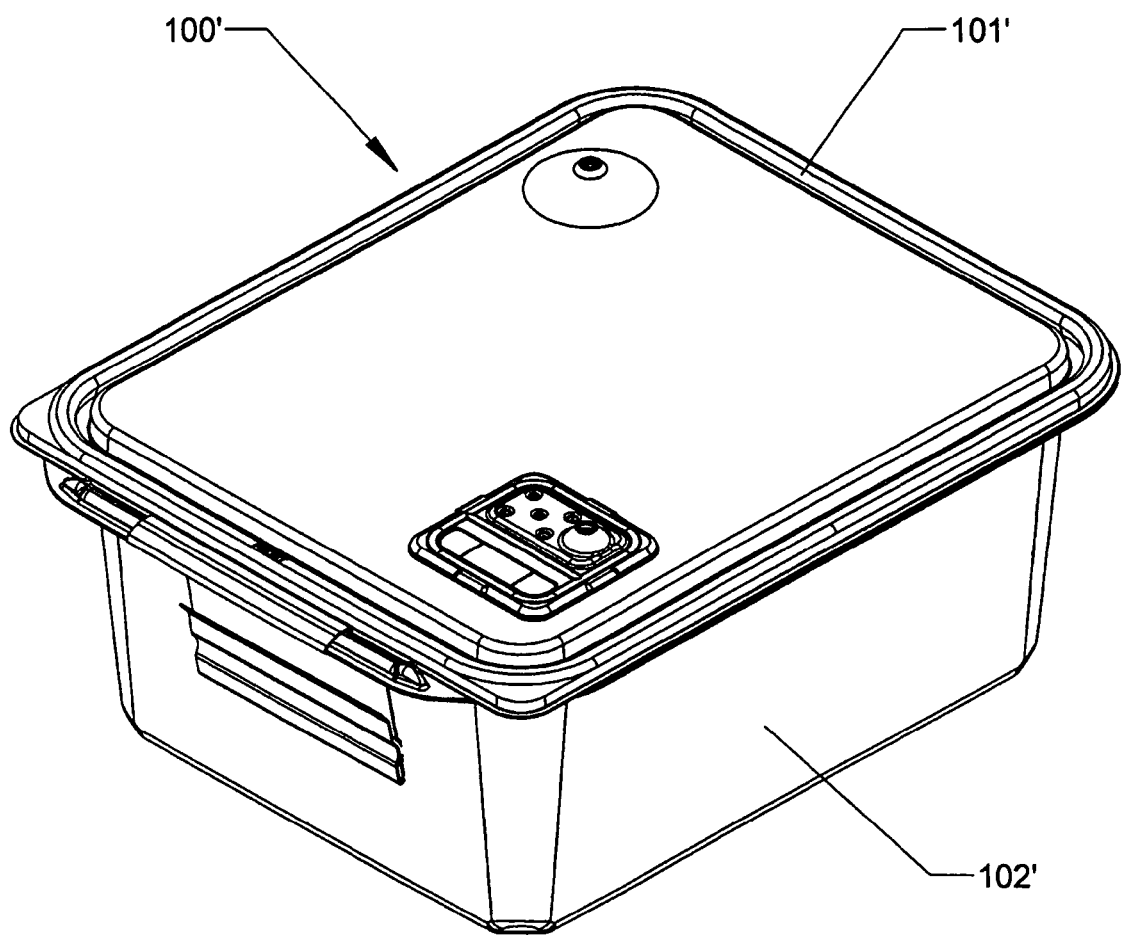
FIG. 21 is a perspective view of a containment cage assembly having a lid and upper rim of a base that are configured to couple together in a snap fit.
Figure 22:
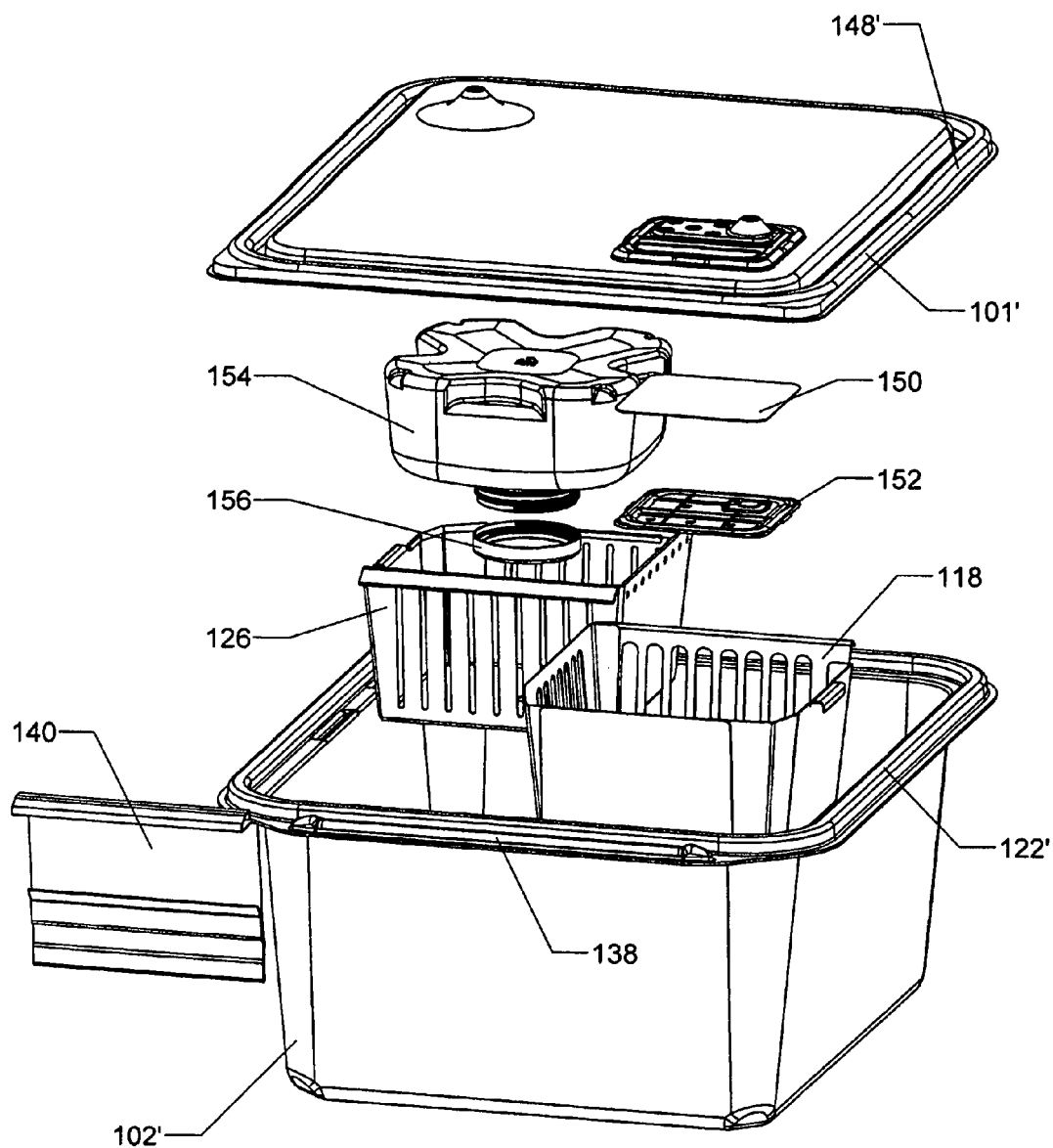
FIG. 22 is an exploded view of the containment cage assembly of FIG. 21.

FIGS. 21 and 22 illustrate a cage assembly embodiment 100' that may have the same features, dimensions and materials as the cage assembly 100 discussed above with the exception that the cage assembly 100' is configured to have a snap fit lid 101' that is configured to be removably secured to a rim 122' of base 102' by a snap fit. For the embodiment shown, the rim 122' of the base 102' extends continuously around the perimeter of the base 102'. In addition, the channel 148' on the perimeter of the lid which is configured to mate by snap fit to the rim 122' of the base also extends continuously around the perimeter of the lid 101'.

Figure 23:
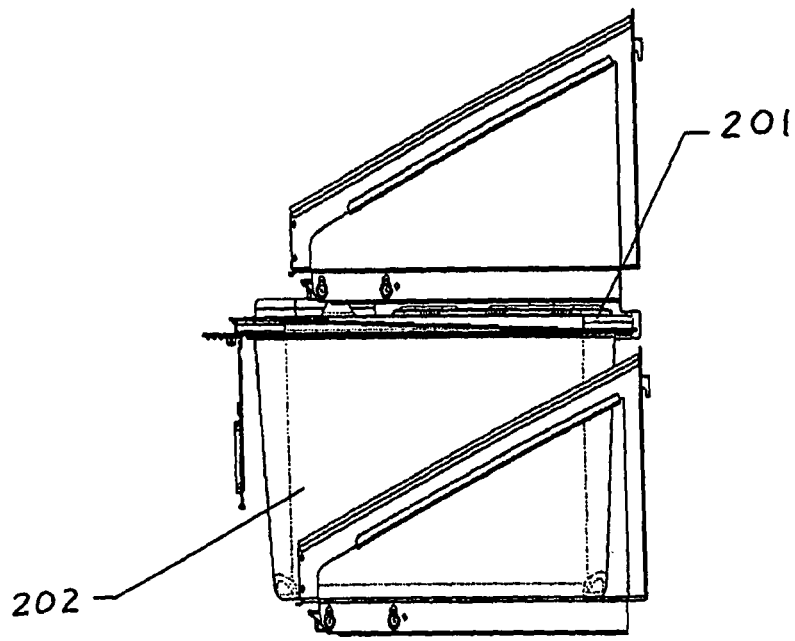
FIG. 23 is an elevation view of an embodiment of a containment cage assembly having a base which is configured to slide open relative to the lid shown in a closed state and disposed in a shelf of a rack system.

Other embodiments of containment cage assemblies and components thereof, including drawer cage assemblies are discussed and shown in U.S. Provisional Patent Application Ser. No. 60/911,271, filed Apr. 11, 2007, naming Dee L. Conger, Thomas M. Perazzo, Francesca McGuffie, and Matthew D. d'Artenay as inventors, entitled "Animal Husbandry Drawer Caging Systems and Components", which is incorporated by reference herein in its entirety. FIG. 23 is a right side view of an embodiment of a cage assembly when the cage is "closed," where cage bottom 202, which also is referred to herein as a "cage base," is fully inserted into a rack shelf system. Lid 201 is in slidable contact with the bottom. This view is of one cage, and multiple cages may be accommodated. For example, as many as 80 cage positions (e.g., rat cages) or 168 cage positions (e.g., mice cages) may be accommodated.

Figure 24:
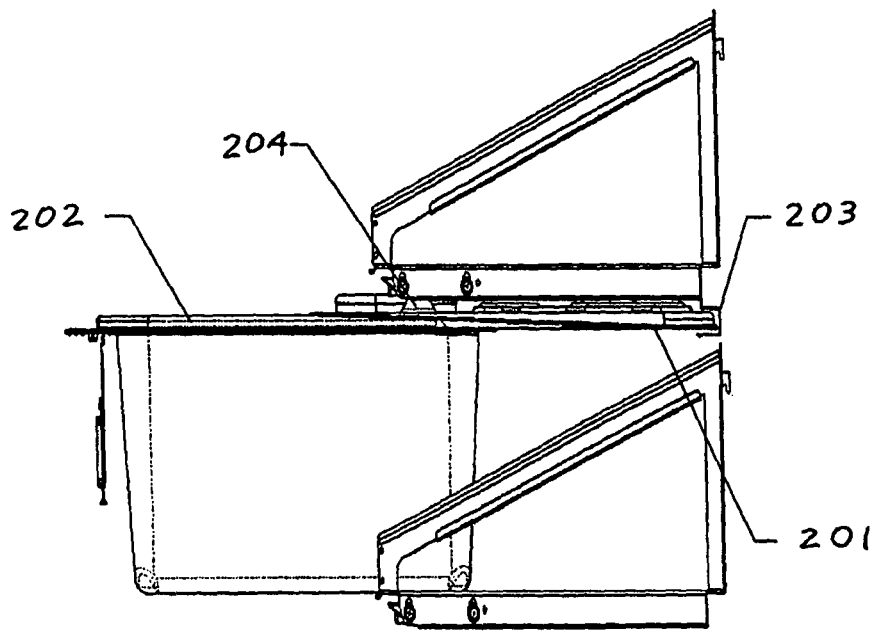
FIG. 24 shows the cage assembly of FIG. 23 in an open state.

FIG. 24 is a right side view of a cage assembly when cage is "opened," where bottom 202 has translated with respect to lid 201. Lid 201 remains captive with respect to the rack as a result of being in contact with a rack member. A rack member in contact with a cage lid sometimes is an air delivery or exhaust device, which can be in the form of a conical connector. In certain embodiments, conical connector 204 exerts downward spring pressure concentrated on lid 201. A rear cone, which is not visible in FIG. 24, also may participate in retaining the lid 201 when 202 slides open. Metal support 203 prevents lid 201 from sagging under the influence of gravity and spring pressure when the cage bottom 202 is in the "open" position.

Figure 25:
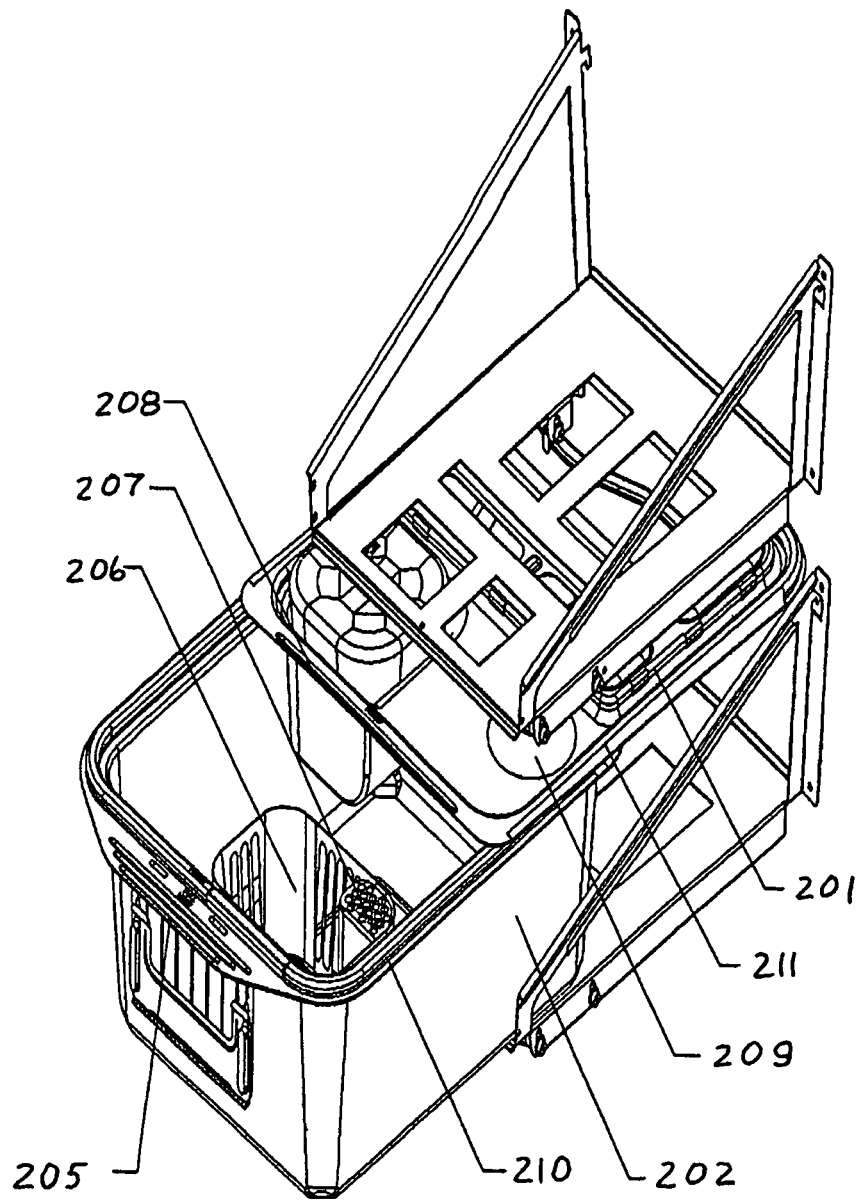
FIG. 25 is a perspective view of the containment cage assembly of FIG. 23 in an open state.

FIG. 25 is an isometric view of the cage and shelf assembly when the drawer bottom 202 is in the open position. Food tray 206 may be constructed from stainless steel or plastic, and may hang or clip onto the front lip of the cage bottom. The width is engineered so that it clears the water bottle cavity when the drawer is closed. Airflow channel 207 directs the flow down towards and/or into the bedding. When the cage drawer is closed, air channel 207 aligns to the cage airflow inlet 209. Extended tab 205 may serve as a handle when pulling the drawer open. A small detent 208 is shaped like an inverted speed bump. When the drawer is closed, detent 208 elastically deflects over rim 210 and then snaps down to retain rim 210 in the closed position. Detent 208 may also provide the user with a snapping closed sensation. Detent 208 may also improve the stiffness of the lid and may reduce the amount of air leakage in this region. Lid member 211 is a guide in which lip 210 slides. Members 210 and 211 may be dovetail shaped to facilitate sliding, but prevent the lid from being easily removed from the bottom (i.e., sliding dovetail). This latter feature may be important in situations where the cage assembly is outside the rack and the contained animals are relatively strong and exert separation pressure to the lid and cage base (e.g., rats). The height of rim 210 tapers from a maximum height in the front to a height of zero in the rear.

Figure 26:
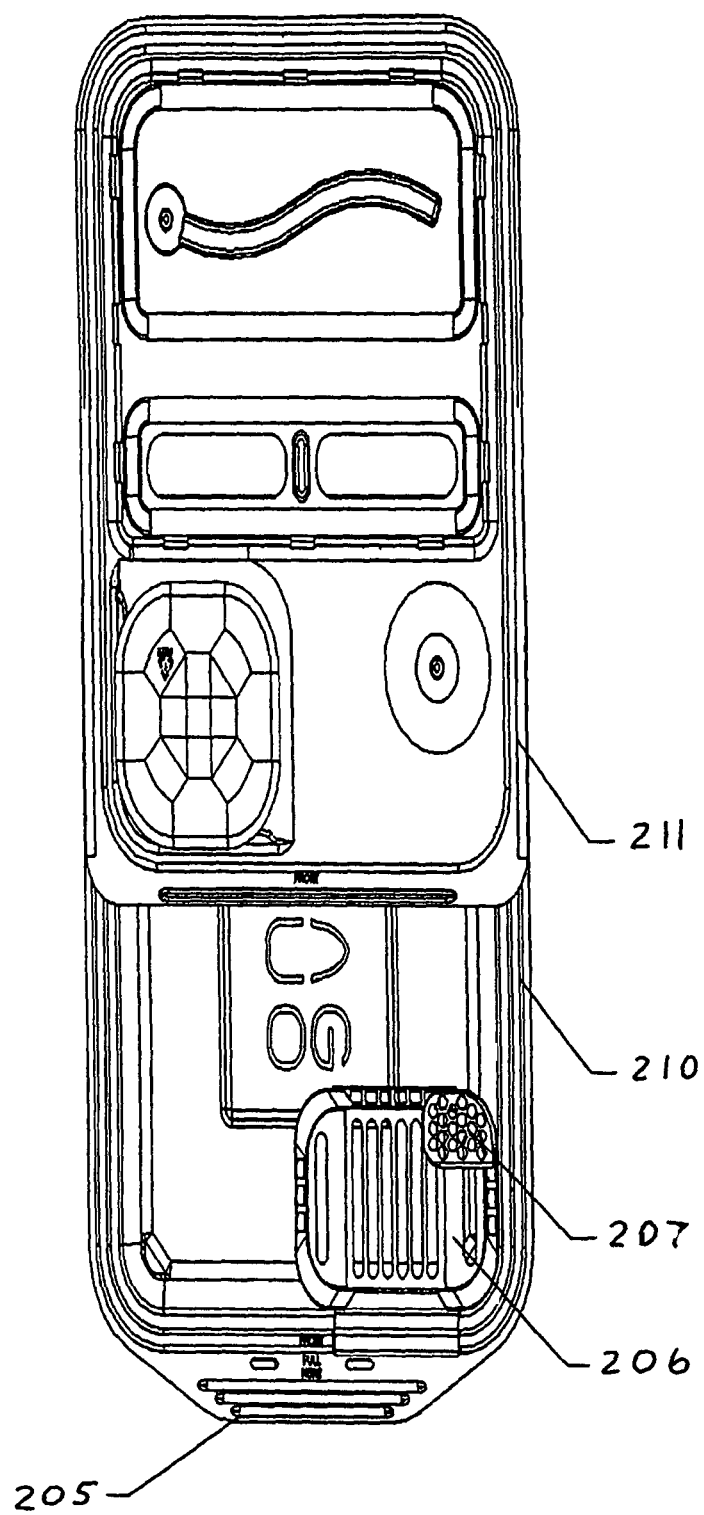
FIG. 26 is a top view of the containment cage assembly of FIG. 25 in an open state without the shelf of the rack system shown.

FIG. 26 is a top view of the cage only without the shelf assembly. Ridges 205 provide additional grip for a user sliding the cage bottom 202 inwards or outwards. A perforated air flow channel 207 directs the incoming flow of air from a ventilation system downwards into the cage base through food tray 206. FIG. 27 is a right side cross-sectional view showing a rear conical exhaust connector 213 and its mating shelf component. FIG. 27 also shows inlet cone 212. Airflow channel 207 allows air to flow downward into the bedding material. Shelf components in the rack shelf assembly directly above each cone of the lid may be spring loaded. A user may pull the lid and cage bottom simultaneously from the rack by engaging the lid and cage base units directly, and the lid and cage bottom will automatically disengage from the spring loaded cone receptacles of the rack.

FIG. 28 is a detail view of the front lip of the cage assembly. Food tray hook 214 snaps over the cage base rim 210. Lid detent 208 snaps over the bottom assembly when the drawer is fully closed. FIG. 29 is a detail view of the rear lip of the cage assembly. Rear detent 215 of the cage base is similar in shape to lid detent 208. Detent 215 elicits a sensation to the user that the cage drawer is fully inserted. Detent 215 also increases the stiffness of the back of the cage. Metal support bracket 203 of the rack supports the lid when the drawer is in the open position.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Modifications may be made to the foregoing without departing from the basic aspects of the embodiment of the invention discussed herein. Although substantial detail has been described with reference to one or more specific embodiments, changes may be made to the embodiments specifically disclosed in this application, and these modifications and improvements may be within the scope and spirit of the embodiments of the invention.

Embodiments illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the invention claimed. The term "a" or "an" can refer to one of or a plurality of the elements it modifies (e.g., "a device" can mean one or more devices) unless it is contextually clear either one of the elements or more than one of the elements is described. The term "about" as used herein refers to a value sometimes within 10% of the underlying parameter (i.e., plus or minus 10%), a value sometimes within 5% of the underlying parameter (i.e., plus or minus 5%), a value sometimes within 2.5% of the underlying parameter (i.e., plus or minus 2.5%), or a value sometimes within 1% of the underlying parameter (i.e., plus or minus 1%), and sometimes refers to the parameter with no variation. For example, a weight of "about 100 grams" can include weights between 90 grams and 110 grams. Thus, it should be understood that although the present invention has been specifically disclosed by representative embodiments and optional features, modification and variation of the concepts herein disclosed may be resorted to by those skilled in the art, and such modifications and variations are considered within the scope of this invention.

What is claimed is:

1. A disposable drawer containment cage assembly for animal containment, comprising:
   a rack containing one or more cages that include a base and a lid;
   the base having sides and a bottom portion having a substantially continuous rectangular structure and having integrated lid contact members disposed substantially parallel to each other at an upper rim on opposite sides of the base; and
   the lid constructed of a polymer and having a generally planar configuration with channel members, one or more upwardly protruding air receptacles constructed of the polymer and integral to the lid,
   wherein the channel members are disposed parallel to each other at opposite sides of the lid and are configured to slidingly engage the integrated lid contact members of the base maintaining the base vertically secured to the lid, and
   wherein said rack further comprises at least one shelf arrangement for receiving said cage, said shelf arrangement comprises a carriage assembly with one or more downwardly extending nozzle elements, said carriage assembly causing frictional engagement between said one or more nozzle elements and said one or more protruding air receptacles wherein the lid is retained within the rack when the cage is fully positioned within the shelf arrangement;
   wherein a first pulling force applied to the cage is sufficient to slide the base outward relative to the lid retained within the rack; and
   wherein a second pulling force applied to the cage is sufficient to slide the base and lid outward relative to the rack, wherein said second pulling force is greater than the first pulling force and sufficient to overcome the frictional engagement of the carriage assembly.

2. The assembly of claim 1 wherein the lid contact members of the base and channels of the lid have an interlocking dovetail configuration.

3. The assembly of claim 1 wherein the lid contact members extend around the perimeter of the front edge of the base.

4. The assembly of claim 3 wherein the lid contact members terminate at the rear edge of the base with an upper rim of the rear edge of the base vertically lower than an upper rim of the contact member to accommodate forward displacement of the base relative to the lid.

5. The assembly of claim 1 wherein the bottom of the base is substantially parallel to the lid contact members and channels of the lid.

6. The assembly of claim 1 wherein the base comprises a polymer having a thickness of about 0.01 inches to about 0.08 inches.

7. The assembly of claim 1 wherein the lid comprises a polymer having a thickness of about 0.01 inches to about 0.08 inches.

8. The assembly of claim 1 wherein the base and lid comprise materials selected from the group consisting of thermoplastics, polyesters, polypropylene (PP), high-density polyethylene, low-density polyethylene, polyethylene teraphthalate (PET), polyvinyl chloride (PVC), polyethylenefluoroethylene (PEFE), polystyrene (PS), high-density polystryrene and acrylnitrile butadiene styrene copolymers.

9. The assembly of claim 1 wherein the rack comprises a support channel configured to mechanically capture a rearward portion of the lid in two or more dimensions so as to stabilize the lid when the base is pulled forward.

10. The assembly of claim 1 wherein the one or more upwardly protruding air receptacles comprises at least one of an air inlet receptacle and an air exhaust receptacle.

11. The assembly of claim 1 wherein the one or more air receptacles are conical.

\* \* \* \* \*